US008856950B2

(12) United States Patent
Kim et al.

(10) Patent No.: US 8,856,950 B2
(45) Date of Patent: Oct. 7, 2014

(54) MOBILE TERMINAL AND METHOD OF MANAGING INFORMATION THEREIN INCLUDING FIRST OPERATING SYSTEM ACTING IN FIRST MODE AND SECOND OPERATING SYSTEM ACTING IN SECOND MODE

(75) Inventors: Dongwoo Kim, Goyang-si (KR); Ki Seo Kim, Seoul (KR); Hyehyun Kim, Seoul (KR); Hyunah Cho, Goyang-si (KR)

(73) Assignee: LG Electronics Inc., Seoul (KR)

( * ) Notice: Subject to any disclaimer, the term of this patent is extended or adjusted under 35 U.S.C. 154(b) by 266 days.

(21) Appl. No.: 13/169,730

(22) Filed: Jun. 27, 2011

(65) Prior Publication Data

US 2012/0157166 A1 Jun. 21, 2012

Related U.S. Application Data

(60) Provisional application No. 61/425,751, filed on Dec. 21, 2010.

(30) Foreign Application Priority Data

Feb. 28, 2011 (KR) .......................... 10-2011-0018238

(51) Int. Cl.
  *H04W 88/02* (2009.01)
  *G06F 21/62* (2013.01)
  *G06F 21/71* (2013.01)
  *H04M 1/725* (2006.01)
(52) U.S. Cl.
  CPC ........... *H04M 1/72563* (2013.01); *G06F 21/71* (2013.01); *H04M 1/72577* (2013.01); *G06F 2221/2105* (2013.01); *H04M 1/72522* (2013.01); *G06F 21/62* (2013.01); *G06F 21/6218* (2013.01)
  USPC .............................. 726/27; 726/30; 719/319

(58) Field of Classification Search
  CPC ............... G06F 21/71; G06F 21/6218; H04M 1/72563; H04M 1/72522; H04M 1/72577
  USPC ................................... 726/30, 27, 2; 719/319
  See application file for complete search history.

(56) References Cited

U.S. PATENT DOCUMENTS

| 5,446,904 | A | * | 8/1995 | Belt et al. ....................... 713/323 |
| 6,763,458 | B1 | * | 7/2004 | Watanabe et al. ............. 713/100 |
| 2003/0013483 | A1 | * | 1/2003 | Ausems et al. ................ 455/556 |
| 2008/0162914 | A1 | * | 7/2008 | Adrangi et al. ................... 713/2 |
| 2008/0184274 | A1 | * | 7/2008 | Ohta et al. .................... 719/319 |
| 2008/0318616 | A1 |   | 12/2008 | Chipalkatti et al. |

(Continued)

FOREIGN PATENT DOCUMENTS

EP 1 686 774 A1 8/2006

Primary Examiner — Jung Kim
Assistant Examiner — Theodore Parsons
(74) Attorney, Agent, or Firm — Birch, Stewart, Kolasch & Birch, LLP

(57) ABSTRACT

A mobile terminal including a communication unit configured to communicate with at least one external terminal; a memory configured to store at least first and second operating systems including at least first and second modes, respectively; and a controller configured to execute the first operating system, to activate the first mode, to control a display unit of the mobile terminal to display a mode configuration screen including selectable options for designating a designated mode corresponding to at least one of the first and second modes to a particular information, and to selectively restrict assigning the particular information from the designated mode to a non-designated mode.

20 Claims, 55 Drawing Sheets (a)

(b)

(56) References Cited

U.S. PATENT DOCUMENTS

| | | | |
|---|---|---|---|
| 2009/0083630 A1* | 3/2009 | Peterson | 715/719 |
| 2009/0119773 A1* | 5/2009 | D'Amore et al. | 726/21 |
| 2009/0170532 A1* | 7/2009 | Lee et al. | 455/456.3 |
| 2009/0183178 A1* | 7/2009 | Imai et al. | 719/318 |
| 2009/0204964 A1* | 8/2009 | Foley et al. | 718/1 |
| 2009/0247215 A1* | 10/2009 | Katsumata | 455/550.1 |
| 2010/0082679 A1* | 4/2010 | Ekberg et al. | 707/783 |
| 2011/0145833 A1* | 6/2011 | De Los Reyes et al. | 718/106 |
| 2011/0252375 A1* | 10/2011 | Chaudhri | 715/835 |
| 2011/0265188 A1* | 10/2011 | Ramaswamy et al. | 726/28 |
| 2012/0231764 A1* | 9/2012 | Lindteigen et al. | 455/410 |

* cited by examiner

FIG. 4A
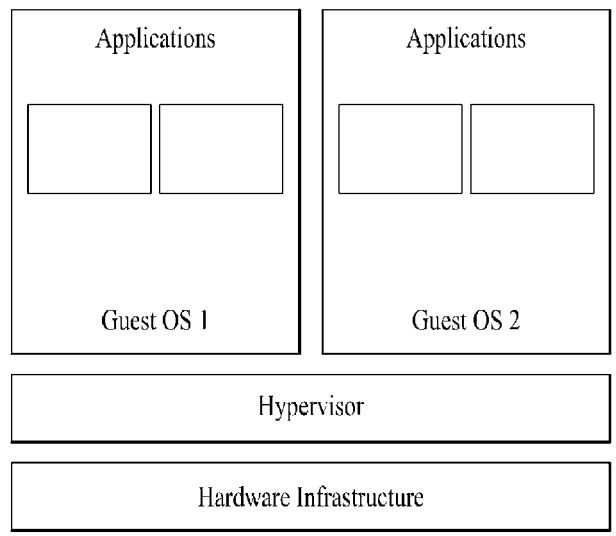
(a)
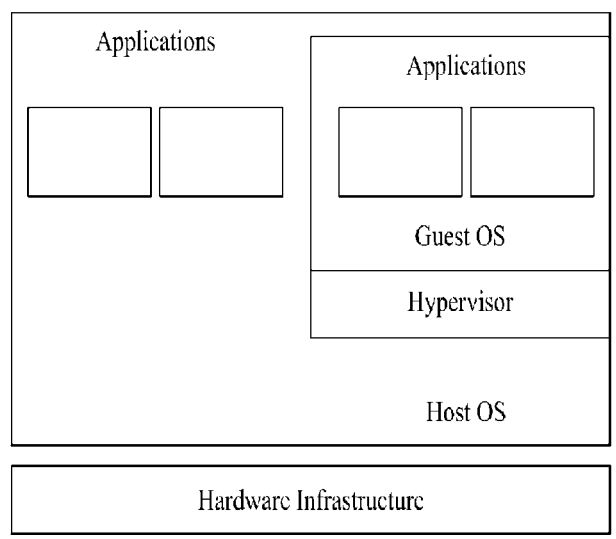
(b)

FIG. 5A
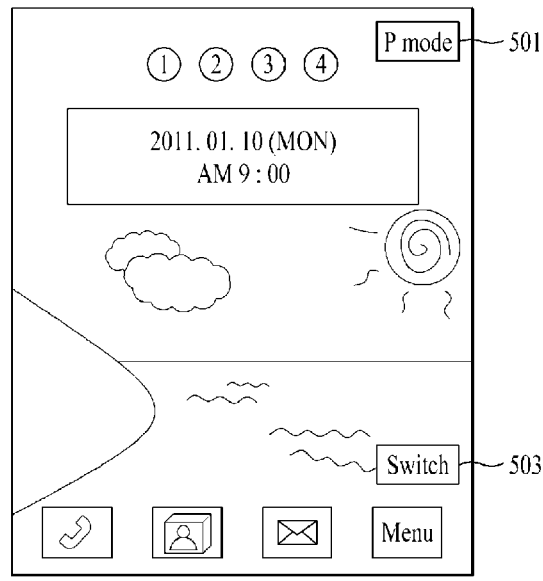
(a)
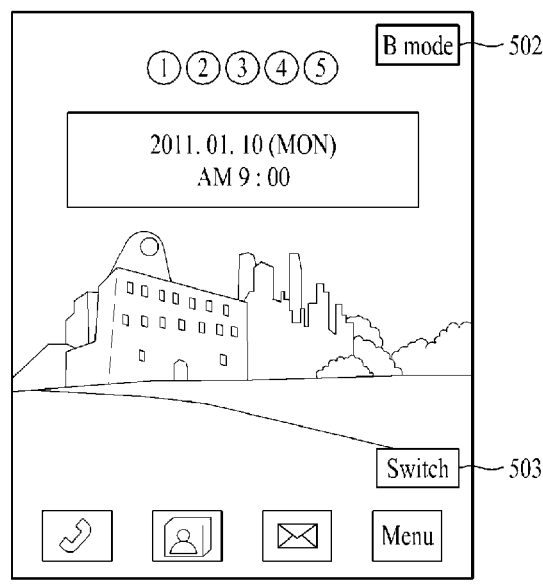
(b)

FIG. 5B
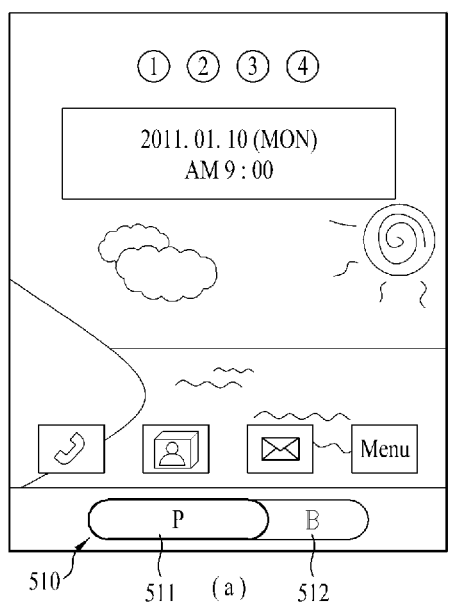
(a)
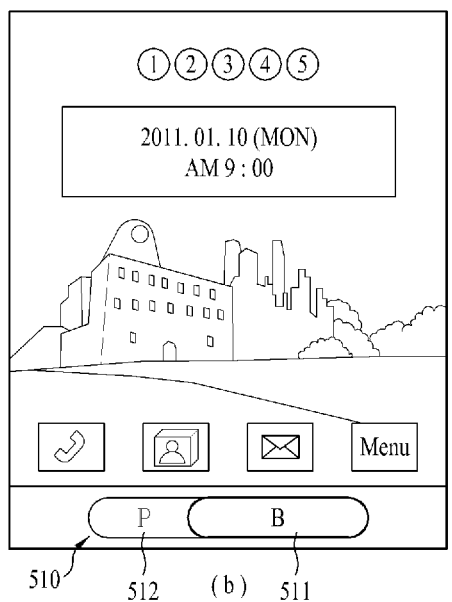
(b)

FIG. 5C
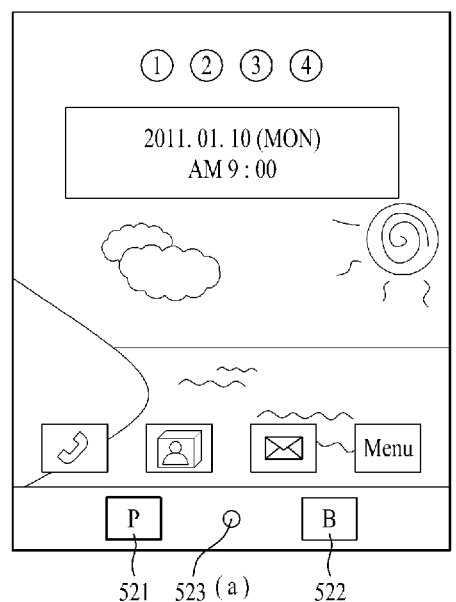
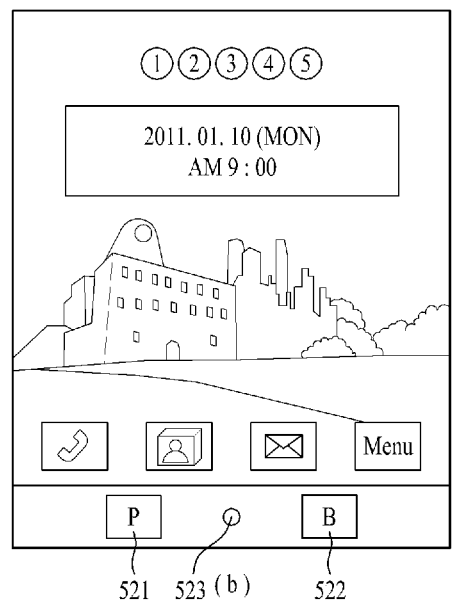

FIG. 5D
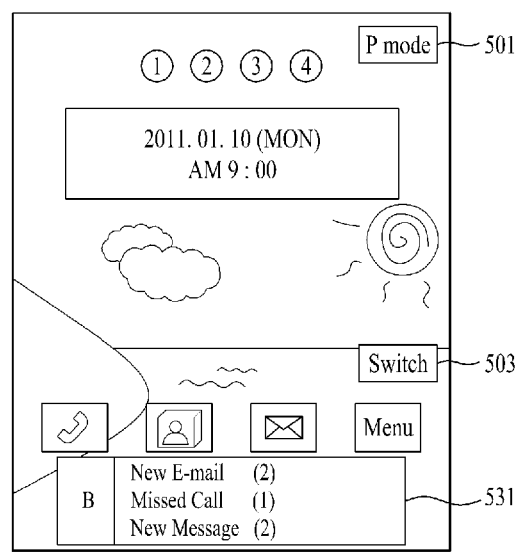
(a)
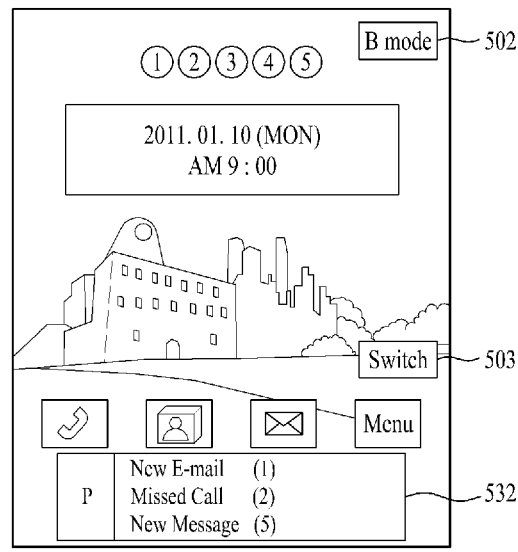
(b)

FIG. 6B
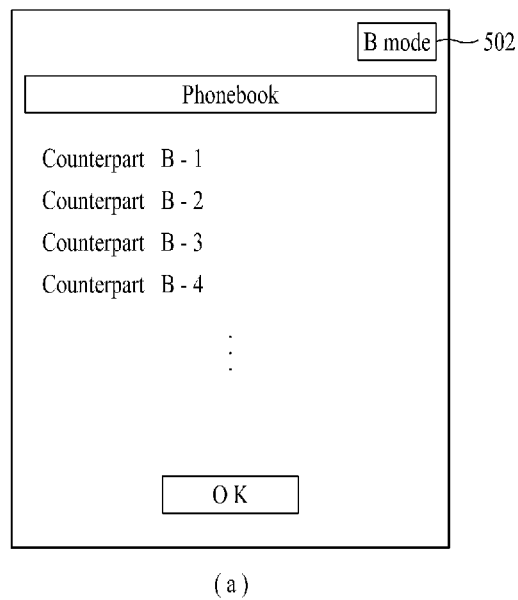
(a)
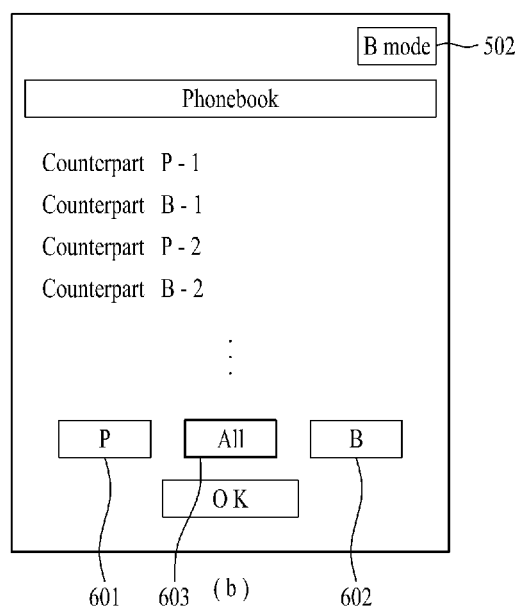
(b)

FIG. 7B
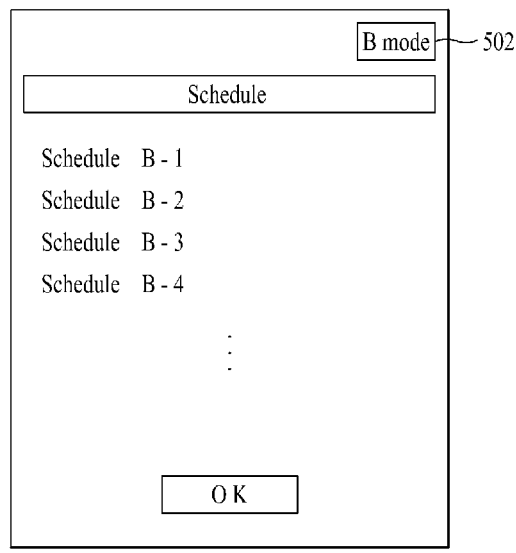
(a)
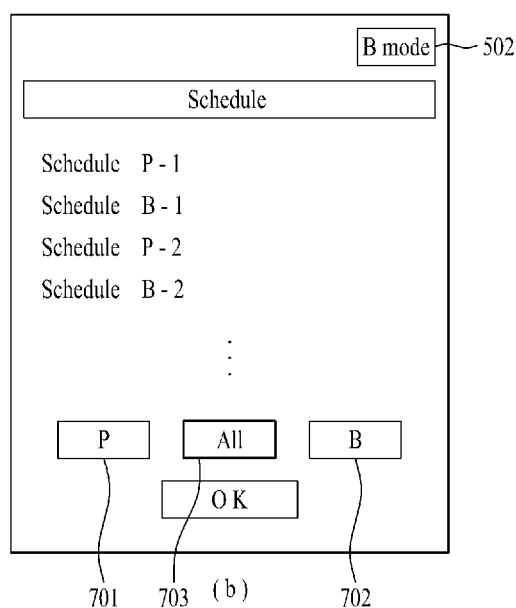
(b)

FIG. 8A
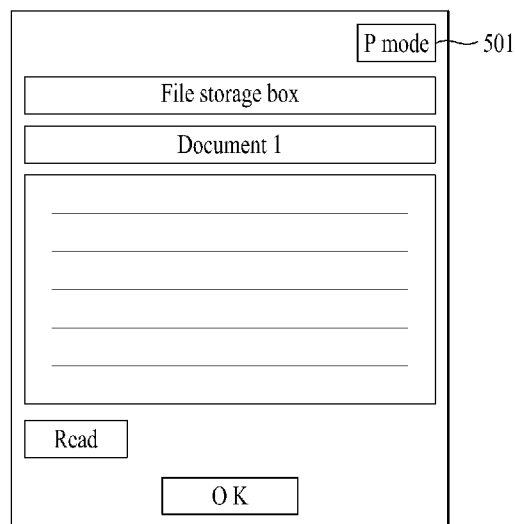
(a)
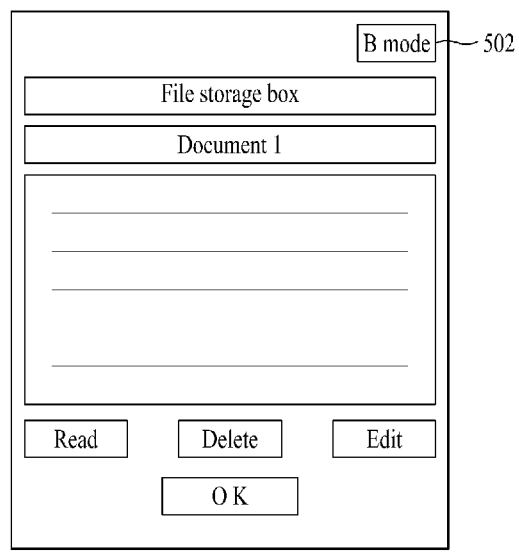
(b)

FIG. 8B
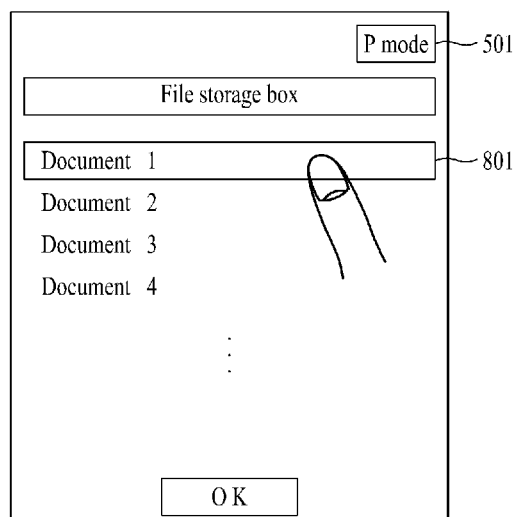
(a)
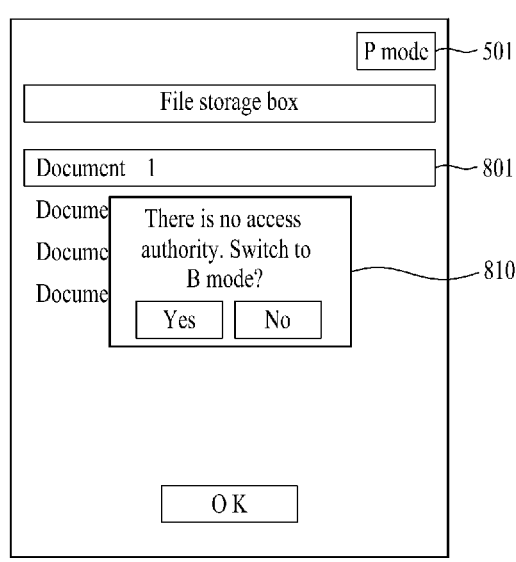
(b)

FIG. 9A
(a)
(b)

FIG. 9B
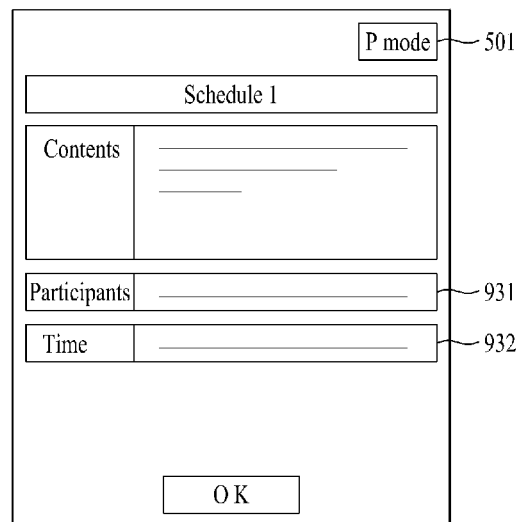
(a)
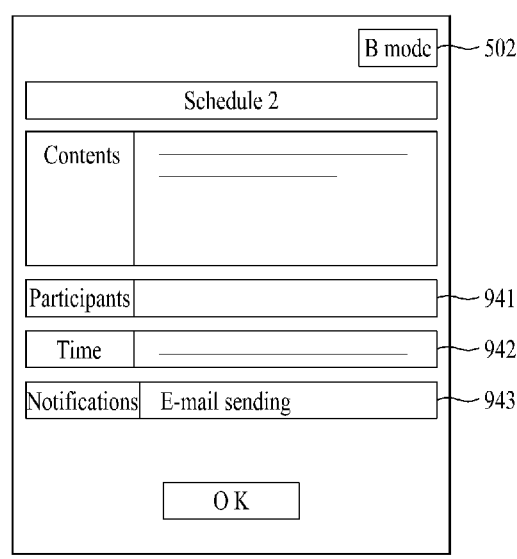
(b)

FIG. 10A

| | | | |
|---|---|---|---|
| | | | P mode |

| A | B | C | D |
|---|---|---|---|
| E | . . | . . | . . |
| . . | . . | . . | . . |
| . . | . . | . . | Z |

(a)

| | | | | | |
|---|---|---|---|---|---|
| | | | | | B mode |

| Q | W | E | . . | . . | P |
|---|---|---|---|---|---|
| A | S | . . | . . | . . | L |
| Z | X | . . | . . | . . | M |
| 1 | 2 | . . | . . | . . | O |

(b)

FIG. 10B
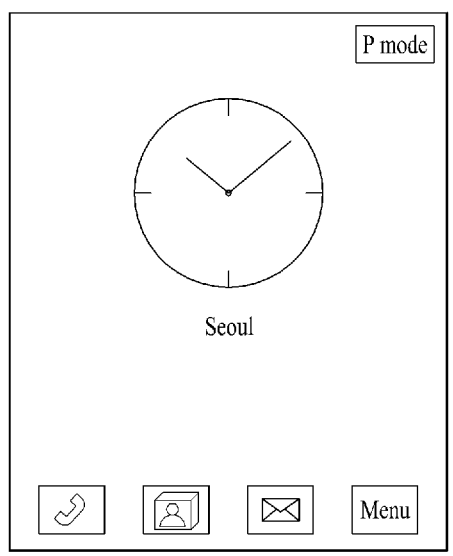
(a)
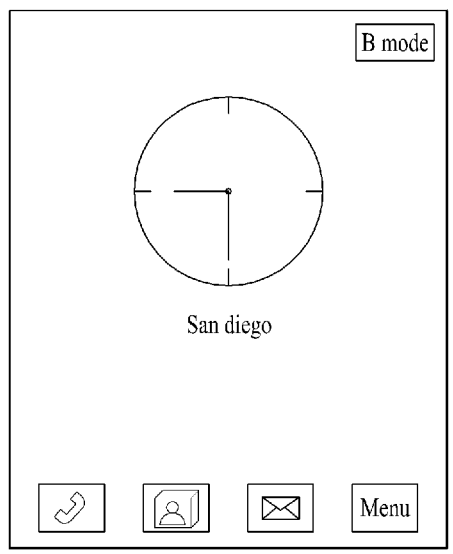
(b)

FIG. 10C
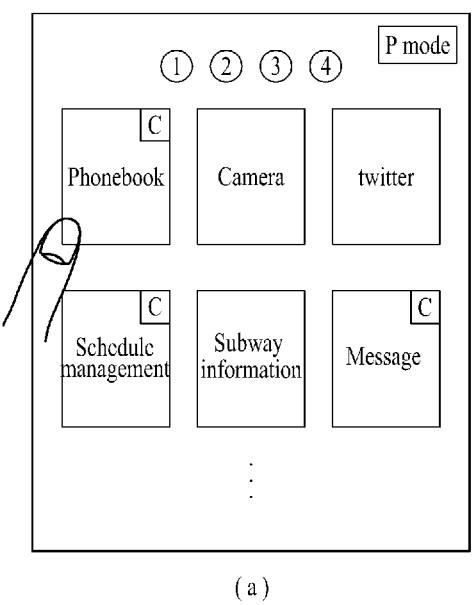
(a)
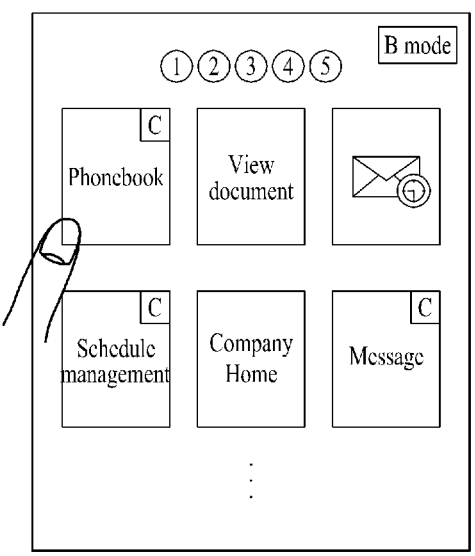
(b)

FIG. 11

| | Dedicated region | | | | Common region | |
|---|---|---|---|---|---|---|
| Business mode | 1st application | 2nd application | 3rd application | 4th application | 10th application | 11th application |
| | Data 1-1 | Content 2-1 | Data 3-1 | Data 4-1 | Content 10-1 | Data 11-1 |
| | Data 1-2 | Content 2-2 | Data 3-2 | Data 4-2 | Content 10-2 | Data 11-2 |
| | ⋮ | ⋮ | ⋮ | ⋮ | ⋮ | ⋮ |
| | Dedicated region | | | | Common region | |
| Private mode | 5th application | 6th application | 7th application | 8th application | 10th application | 11th application |
| | Content 5-1 | Data 6-1 | Content 7-1 | Content 8-1 | Content 10-3 | Data 11-3 |
| | Content 5-2 | Data 6-2 | Content 7-2 | Content 8-2 | Content 10-4 | Data 11-4 |
| | ⋮ | ⋮ | ⋮ | ⋮ | ⋮ | ⋮ |

FIG. 13A

| Mode configuration setting |
|---|
| 1. Per-mode application designation |
| 2. Per-mode content designation |
| 3. Per-mode data designation |

FIG. 13B
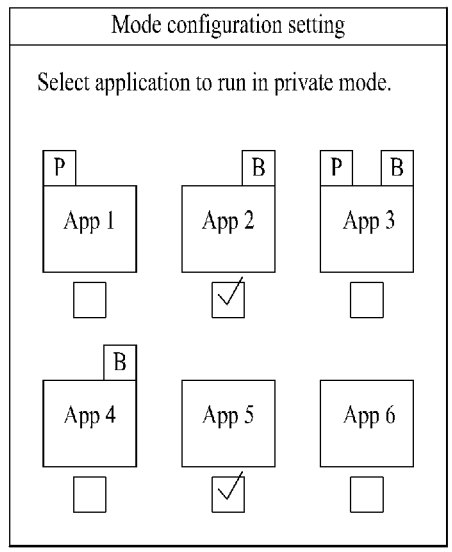
(a)
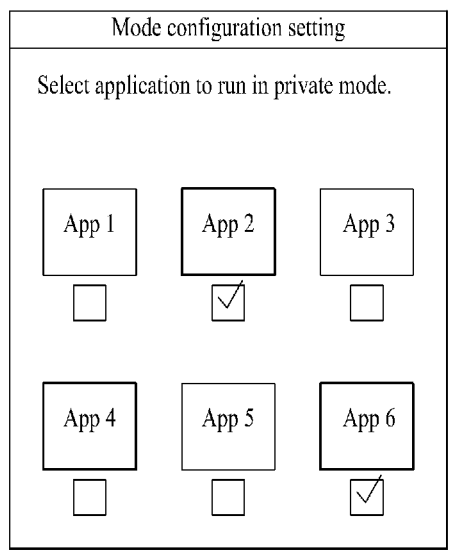
(b)

FIG. 13C

| Mode configuration setting |
|---|
| Select content to run in business mode. |
| 1st content ( P )  ☐ |
| 2nd content  ☑ |
| 3rd content ( B )  ☑ |
| 4th content ( PB )  ☐ |

(a)

| Mode configuration setting |
|---|
| Select application to run in business mode. |
| ☐ 1st content ( P )  ☑ |
| 2nd content  ☐ |
| ☐ 3rd content ( B )  ☐ |
| 4th content ( PB )  ☐ |

| Mode configuration setting |
|---|
| Select data to run in business mode. |
| 1st data (P) ☐ |
| 2nd data ☑ |
| 3rd data (B) ☑ |
| 4th data (PB) ☐ |

(a)

| Mode configuration setting |
|---|
| Select data to run in business mode. |
| 1st data (P) ☑ |
| 2nd data ☐ |
| 3rd data (B) ☐ |
| 4th data (PB) ☐ |

(b)

FIG. 14A
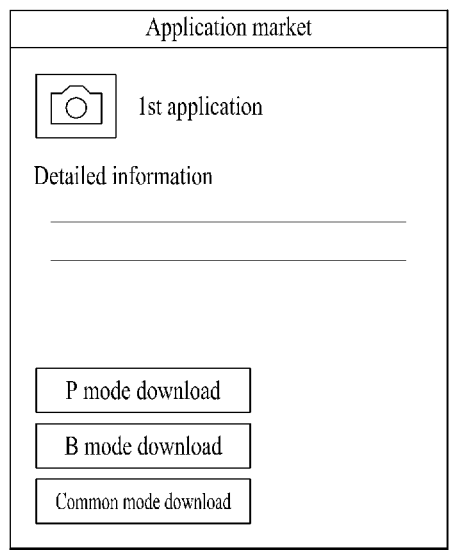
(a)
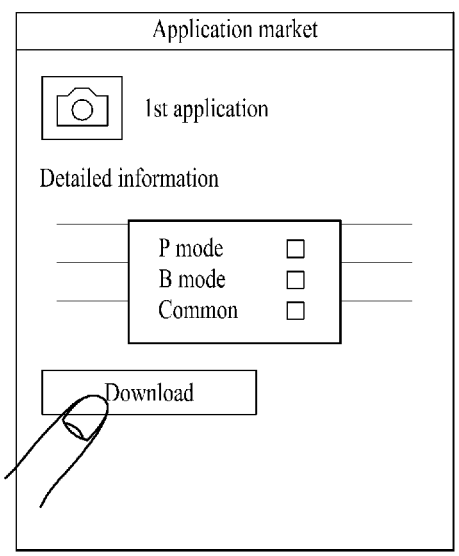
(b)

FIG. 14B
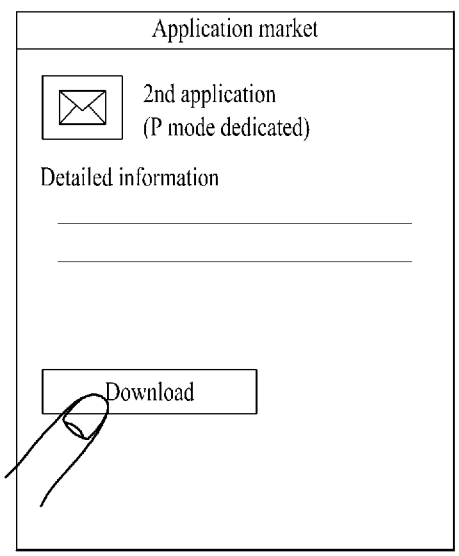
(a)
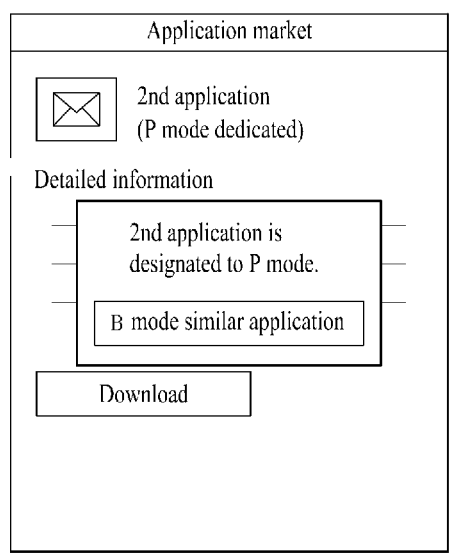
(b)

FIG. 15A
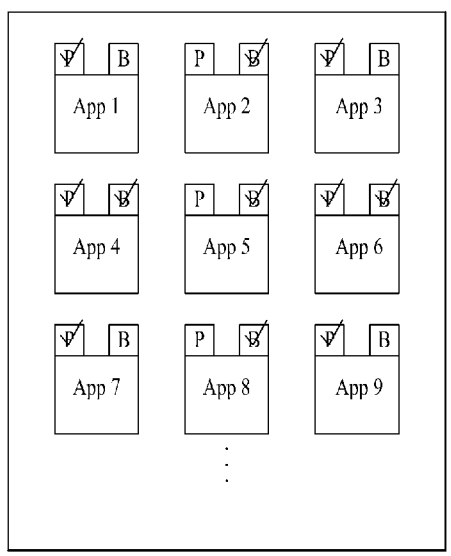
(a)
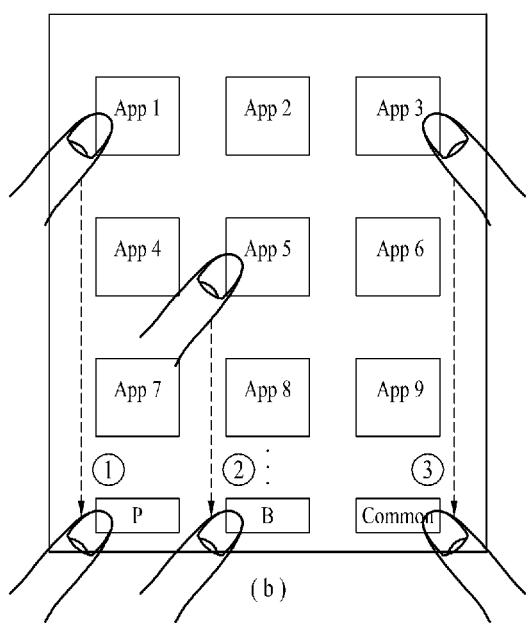
(b)

FIG. 15B
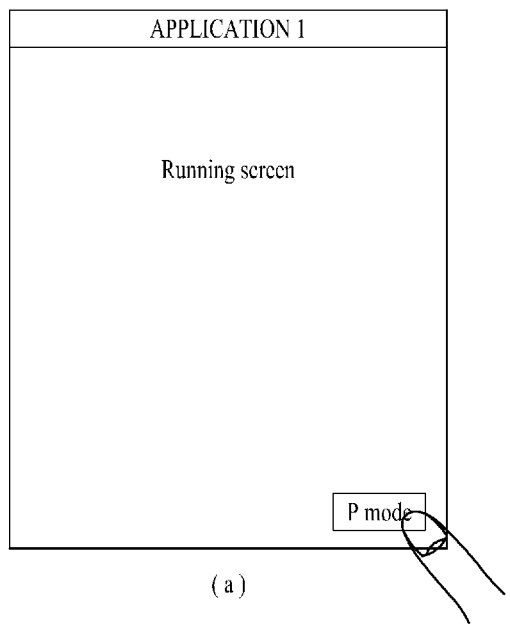
(a)
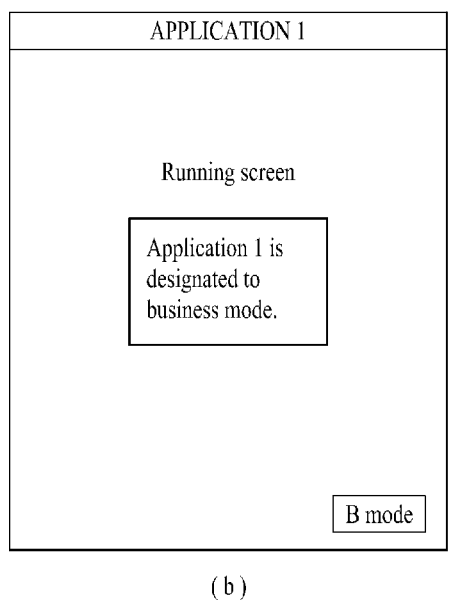
(b)

FIG. 16B
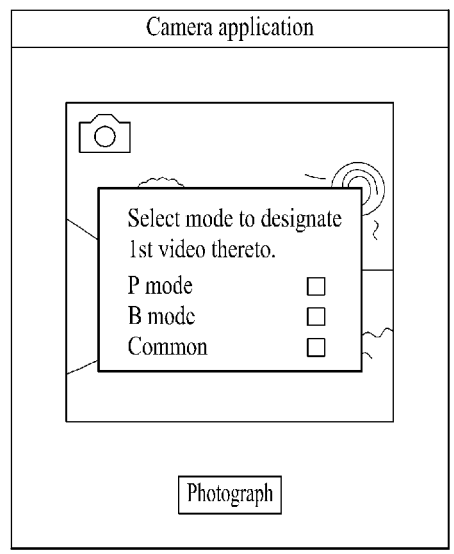
(a)
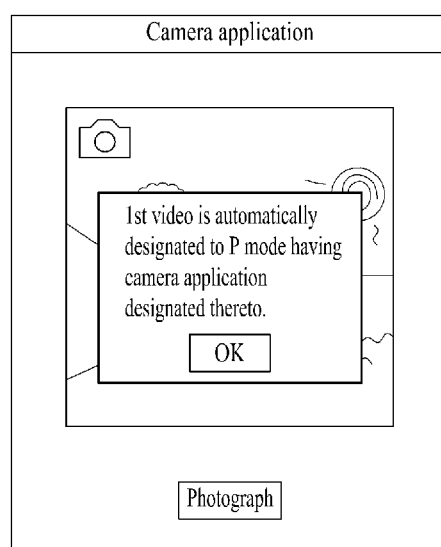
(b)

FIG. 17B
(a)
(b)

FIG. 19A

| P mode function setting | |
|---|---|
| Voice call | ☑ |
| Video call | ☐ |
| E-mail | ☐ |
| Message | ☑ |
| Messenger | ☑ |
| Camera | ☑ |

| B mode function setting | |
|---|---|
| Voice call | ☑ |
| Video call | ☐ |
| E-mail | ☑ |
| Message | ☐ |
| Messenger | ☑ |
| Camera | ☐ |

| B mode function setting | |
|---|---|
| Voice call | ☐ |
| Video call | ☐ |
| E-mail | ☐ |
| Message | ☐ |
| Messenger | ☐ |
| Camera | ☐ |
| OK | |

FIG. 20A
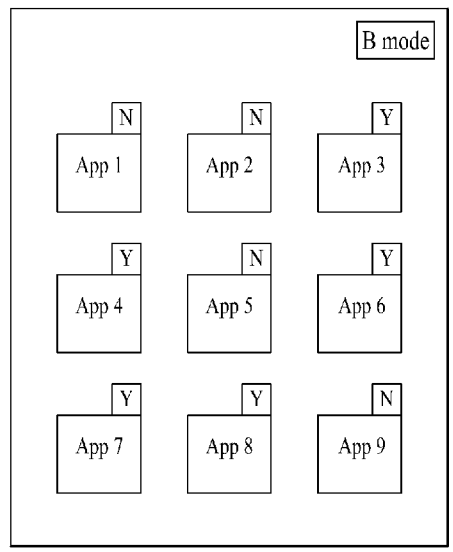
(a)
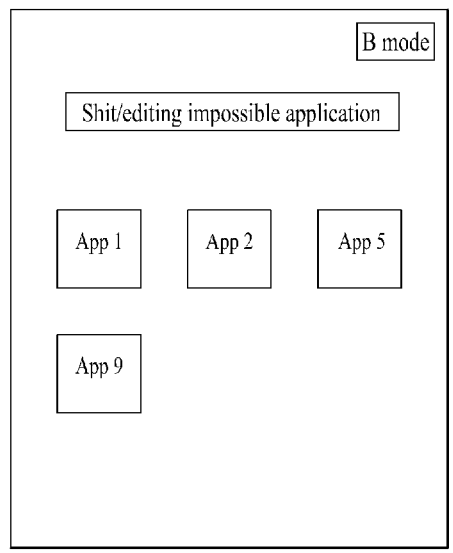
(b)

FIG. 20B
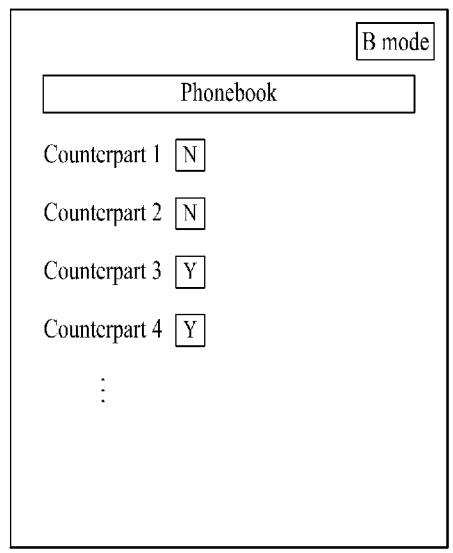
(a)
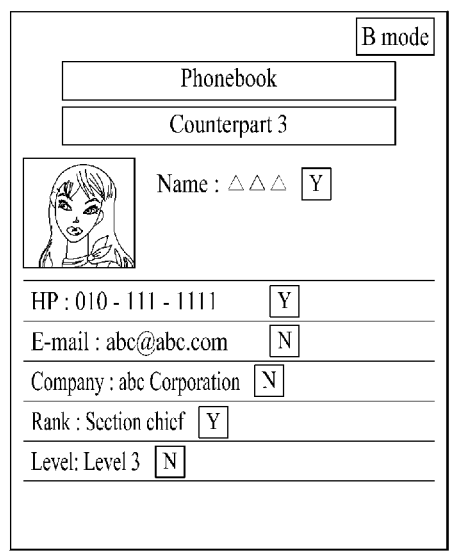
(b)

FIG. 21
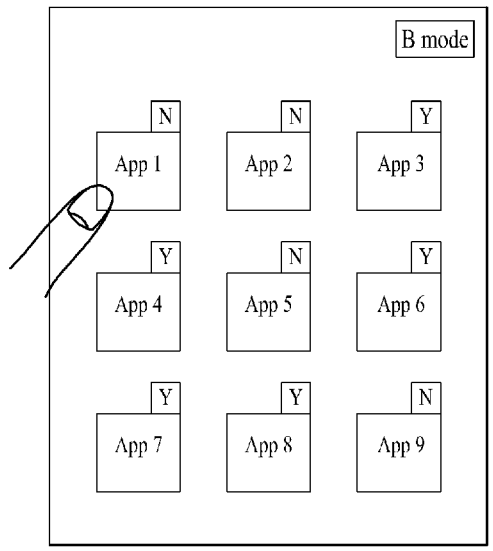
(a)
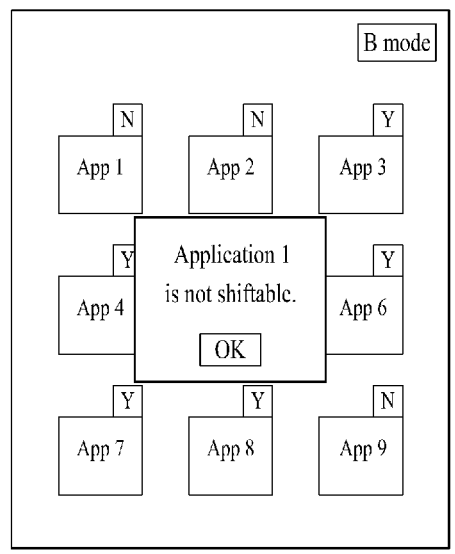
(b)

FIG. 22A
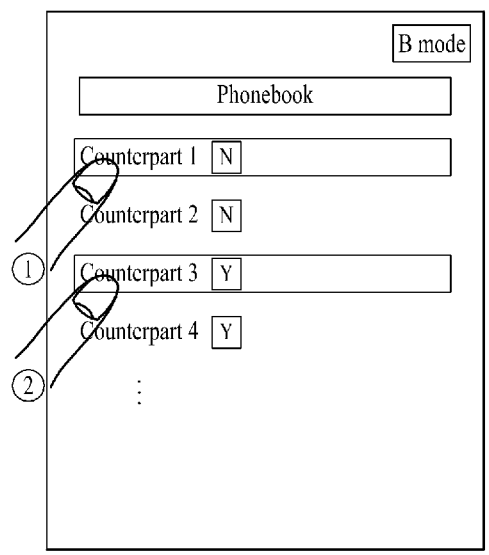
(a)
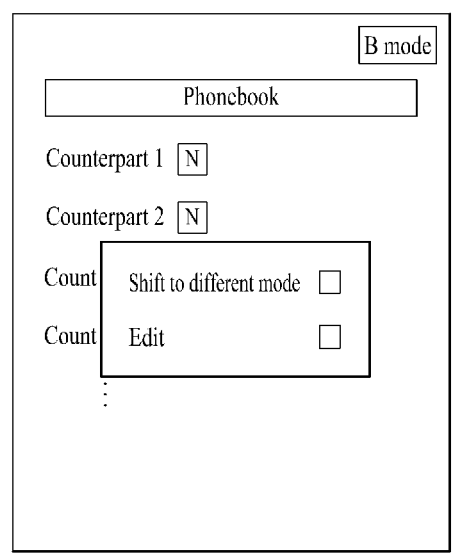
(b)

FIG. 22B
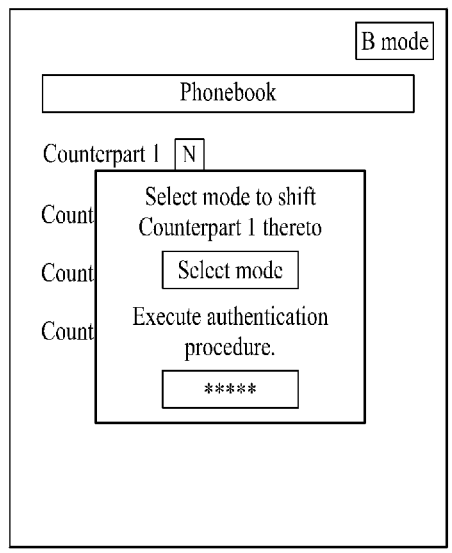
(a)
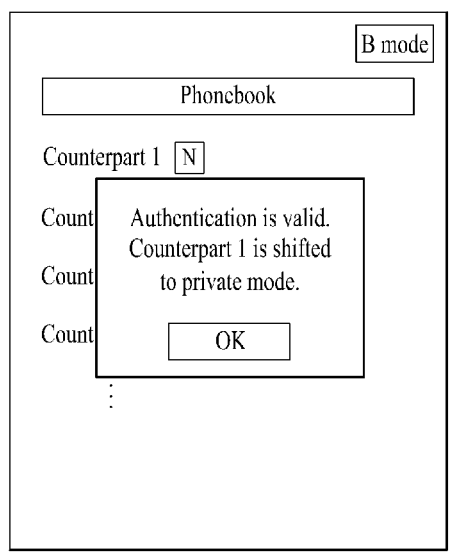
(b)

FIG. 22D
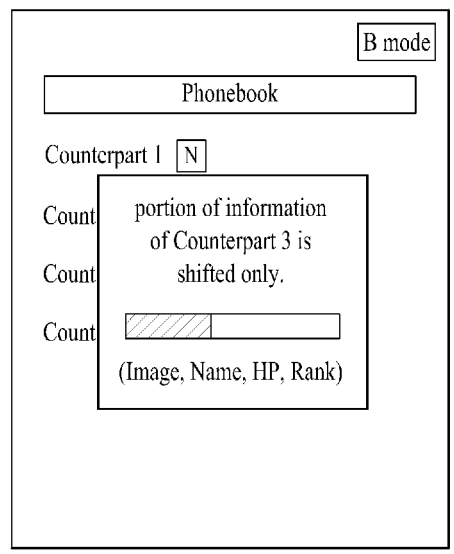
(a)
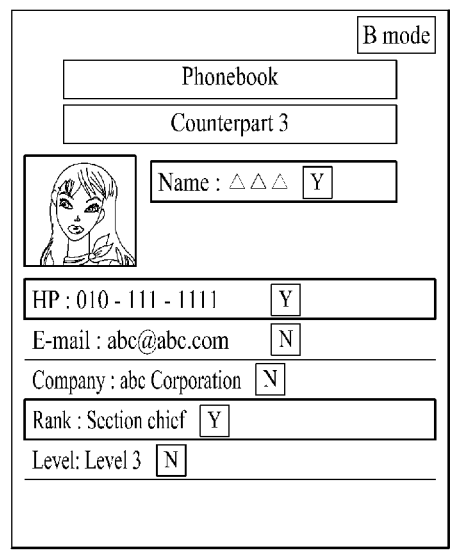
(b)

FIG. 23A
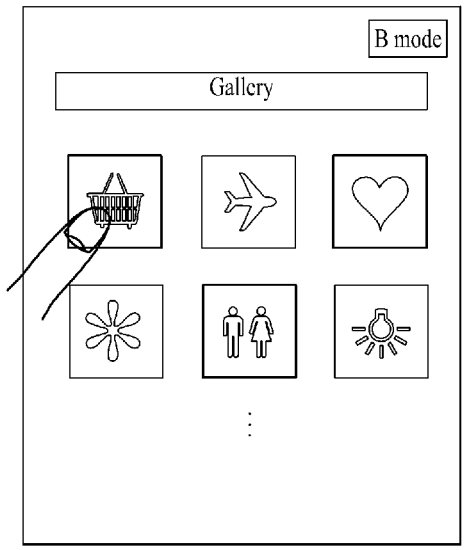
(a)
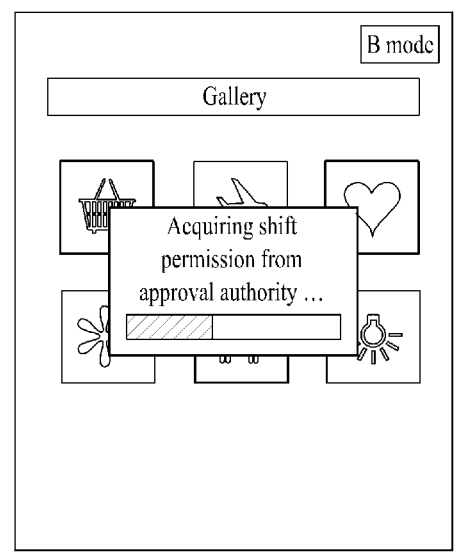
(b)

FIG. 24B

| Private made | Business mode |
|---|---|
| indicator | indicator |
| Wireless & network settings | Wireless & network settings |
| Airplane mode ☑<br>disable all wireless connections | Airplane mode ☑<br>disable all wireless connections |
| WI-FI<br>Turn on Wi-Fi ☑ | WI-FI<br>Turn on Wi-Fi ☑ |
| WI-FI settings<br>set up & manage wireless access points | WI-FI settings<br>set up & manage wireless access points |
| Smartshare<br>make shared contents ☐<br>discoverable by other device | Smartshare<br>make shared contents ☑<br>discoverable by other device |
| SmartShare settings<br>manage smartshare, set device name | SmartShare settings<br>manage smartshare, set device name |
| Bluetooth<br>Turn on Bluetooth | Bluetooth<br>Turn on Bluetooth |
| Bluetooth settings | Bluetooth settings |
| (a) | (b) |

FIG. 25B

| Business mode | |
|---|---|
| indicator | |
| Private mode control | |
| incoming Calls | |
| Accept Business call  accept private calls  mode contact | ∨ |
| Alert & notifications | |
| All  notify all events from Business  mode | ∨ |
| Missed call | ☐ |
| Message | ☐ |
| Voicemail | ☐ |
| Email | ☐ |
| Alarm | ☐ |
| Calendar | ☐ |
| Task | ☐ |

(a)

| indicator | |
|---|---|
| Private mode control | |
| incoming Calls | |
| Accept Business call  accept private calls  mode contact | ∨ |
| Alert & notifications | |
| All  notify all events from Business  mode | ∨ |
| Missed call | ∨ |
| Message | ∨ |
| Voicemail | ∨ |

(b)

MOBILE TERMINAL AND METHOD OF MANAGING INFORMATION THEREIN INCLUDING FIRST OPERATING SYSTEM ACTING IN FIRST MODE AND SECOND OPERATING SYSTEM ACTING IN SECOND MODE

Pursuant to 35 U.S.C. §119(e), this application claims the benefit of U.S. Provisional Application Ser. No. 61/425,751 filed on Dec. 21, 2010, which is hereby incorporated by reference as if fully set forth herein. Pursuant to 35 U.S.C. §119(a), this application also claims the benefit of earlier filing date and right of priority to Korean Application No. 10-2011-0018238, filed on Feb. 28, 2011, the contents of which are hereby incorporated by reference herein in their entirety.

BACKGROUND OF THE INVENTION

1. Field of the Invention

The present invention relates to a mobile terminal, and more particularly, to a mobile terminal and method of managing information therein. Although the present invention is suitable for a wide scope of applications, it is particularly suitable for implementing a plurality of modes.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Recently, a mobile terminal tends to be used for a business need as well as a personal need. In addition, it is necessary to implement the mobile terminal suitable for both of the personal need and the business need. Moreover, the demand for using the mobile terminal for the purpose of the personal need or the business need separately keeps rising.

However, a mobile terminal according to a related art fails in providing an environment in which the mobile terminal can be separately used for the purpose of the personal need or the business need.

SUMMARY OF THE INVENTION

Accordingly, the present invention is directed to a mobile terminal and method of managing information therein that substantially obviate one or more problems due to limitations and disadvantages of the related art.

An object of the present invention is to provide a mobile terminal and method of managing information therein, by which a plurality of modes can be implemented and activated for user's convenience and data security in a manner of being discriminated from each other.

Another object of the present invention is to provide a mobile terminal and method of managing information therein, by which at least one function, at least one application, or at least one content/data can be designated to a plurality of modes.

A further object of the present invention is to provide a mobile terminal and method of managing information therein, by which at least one of a function, an application and a content or data designated to one mode can be restricted from being edited or shifted to a different mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to an embodiment of the present invention includes at least one operating system capable of implementing a plurality of modes including a first mode and a second mode, at least one application running in at least one of a plurality of the modes, and a controller designating at least one of a function, an application, a content and a data to the first mode and the second mode, the controller controlling at least one of the designated function, the designated application, the designated content and the designated data to run in a corresponding mode. Moreover, at least one of the function, the application, the content and the data, which are designated to a prescribed one of the first mode and the second mode, is restricted from at least one of an editing and a shift to a different mode.

In another aspect of the present invention, a method of managing information in a mobile terminal, which implements a plurality of modes including a first mode and a second mode, includes the steps of designating at least one of a function, an application, a content and a data to the first mode and the second mode, controlling at least one of the function, the application, the content and the data, which are designated to the first mode and the second mode, to run in a corresponding mode, receiving a command for at least one of an editing and a shift to a different mode for the at least one of the function, the application, the content and the data, which are designated to a prescribed one of the first mode and the second mode, and limitedly performing the at least one of the editing and the shift to the different mode on the at least one of the function, the application, the content and the data, for which the command is input.

In still another aspect, the present invention provides a mobile terminal including a communication unit configured to communicate with at least one external terminal; a memory configured to store at least first and second operating systems including at least first and second modes, respectively; and a controller configured to execute the first operating system, to activate the first mode, to control a display unit of the mobile terminal to display a mode configuration screen including selectable options for designating a designated mode corresponding to at least one of the first and second modes to a particular information, and to selectively restrict assigning the particular information from the designated mode to a non-designated mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A to 4C are block diagrams of components required for operating a plurality of operating system for implementing a plurality of modes according an embodiment of to the present invention;

FIGS. 5A to 10C are diagrams for discriminating a plurality of modes according to an embodiment of the present invention;

FIG. 11 is a diagram of information configuration in a business mode and a private mode according to an embodiment of the present invention;

FIGS. 13A to 13D are diagrams of screen configurations for designating information per mode using a menu according to an embodiment of the present invention;

FIGS. 14A to 15B are diagrams of screen configurations for designating an application per mode according to an embodiment of the present invention;

FIGS. 16A and 16B are diagrams of screen configurations for designating a content per mode according to an embodiment of the present invention;

FIGS. 17A and 17B are diagrams of screen configurations for designating a data per mode according to an embodiment of the present invention;

FIGS. 19A to 19C are diagrams of screen configurations for designating a function per mode according to an embodiment of the present invention;

FIGS. 20A to 20C are diagrams of screen configurations for identifiably displaying an editing/shift restricted information or an editable/shiftable information according to an embodiment of the present invention;

FIG. 21 is a diagram of screen configuration for an application shift according to an embodiment of the present invention;

FIGS. 22A to 22D are diagrams of screen configurations for data editing/shift according to an embodiment of the present invention;

FIGS. 23A and 23B are diagrams of screen configurations for shifting a content according to an embodiment of the present invention;

FIGS. 24A and 24B are diagrams of screen configurations for applying a configuration setting condition of one mode to another mode according to an embodiment of the present invention; and FIGS. 25A and 25B are diagrams of screen configurations for setting an event occurrence indicating condition of one mode in another mode according to an embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except an instance applicable to a mobile terminal only, it is apparent to those skilled in the art that the configurations according to an embodiment described in this disclosure is applicable to such a stationary terminal as a digital TV, a desktop computer and the like.

Figure 1:
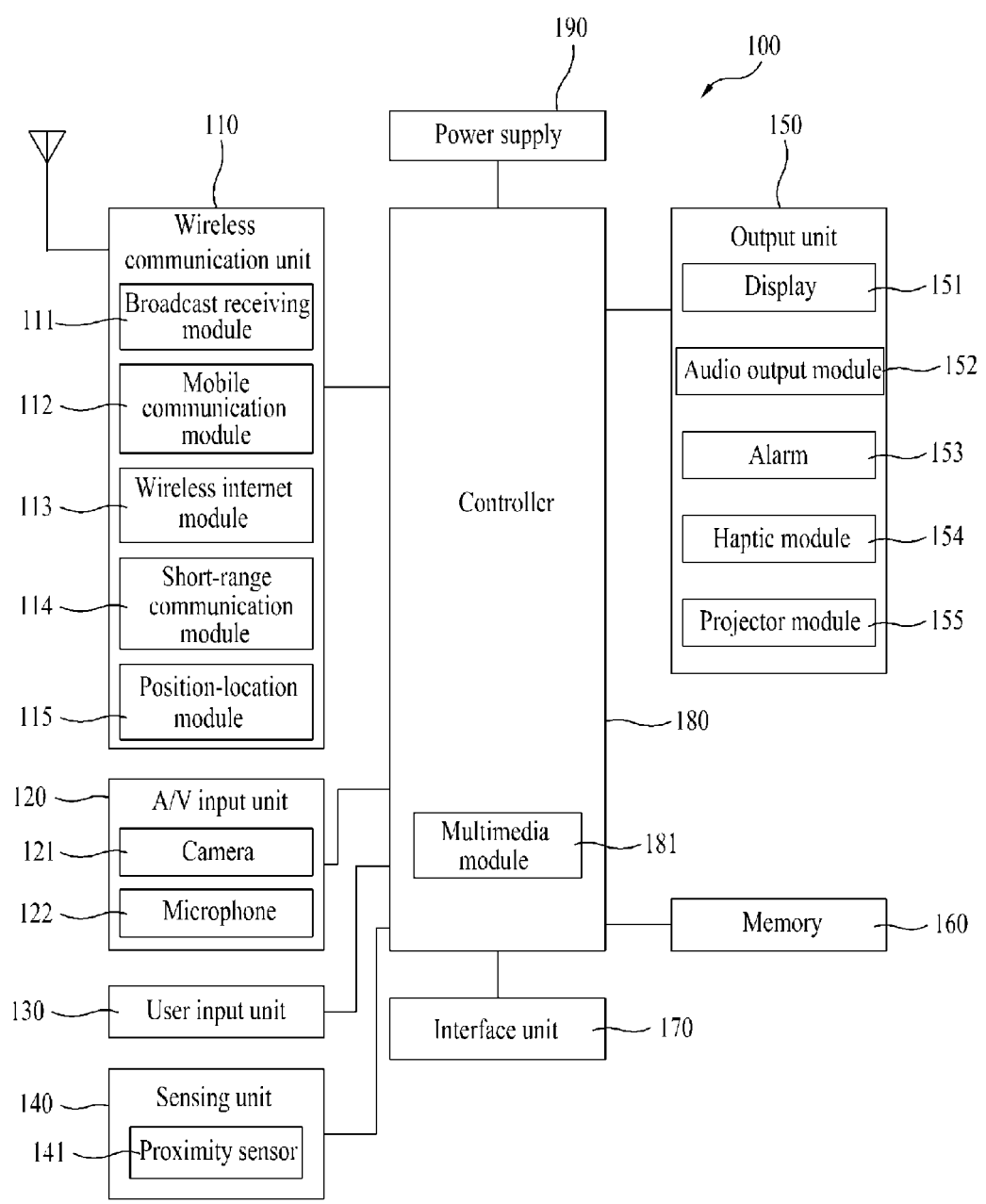
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user can see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

When the display unit 151 and a sensor for detecting a touch action (hereinafter called 'touch sensor') configures a mutual layer structure (hereinafter called 'touchscreen'), it can use the display unit 151 as an input device as well as an output device. In this instance, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display unit 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. In addition, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The unit 153 can output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing means for producing an image to output externally using the light generated from the light source, and a lens for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-minor device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
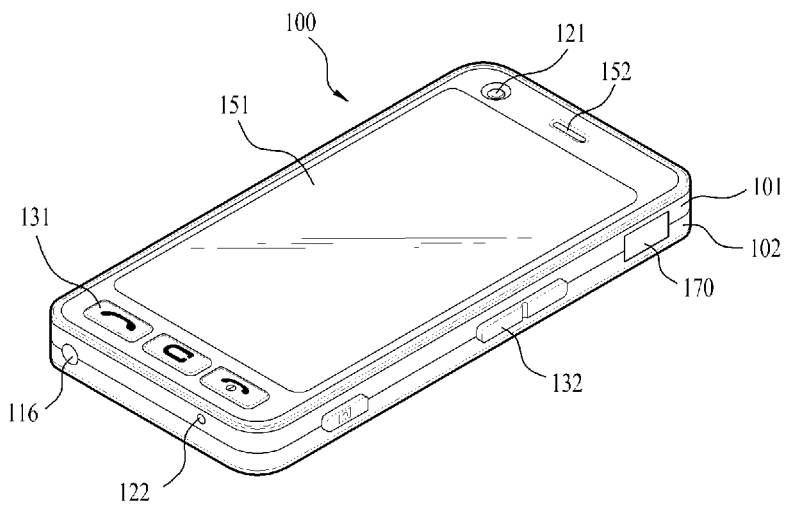
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example. The display unit 151, the audio output unit 152, the camera 121, user input units 130/131 and 132, the microphone 122, the interface 170 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display unit 151 or the like can be input to the second manipulating unit 132.

Figure 2B:
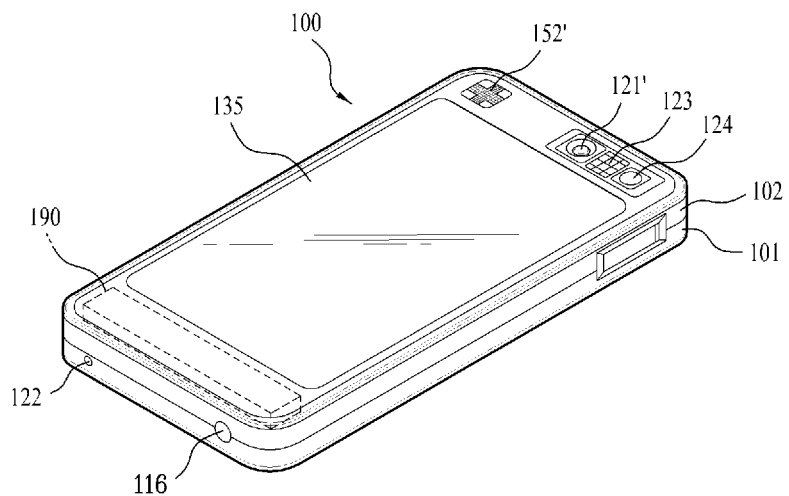
FIG. 2B is a rear perspective diagram of a mobile terminal according to one embodiment of the present invention.

FIG. 2B is a perspective diagram of a backside of the terminal shown in FIG. 2A. Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the minor 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this instance, if the display unit 151 is configured to output visual information from its both faces, it can recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

First of all, a mobile terminal mentioned in the following description can include at least one of the components shown in FIG. 1. In addition, in order to perform an operation using the components (e.g., touchscreen, wireless communication unit, memory, etc.), the controller 180 can control an individual operation of each of the components or interconnected operations among a plurality of the components.

Applications mentioned in this disclosure are software programs drivable in a mobile terminal. If the application is driven, it can execute a corresponding function or operation. The application is basically stored in the mobile terminal (particularly, memory 160) or can be downloaded from an external server of an external terminal.

For example, the applications can include a compass, an augmented reality, a camera, a video player, a music player, a game, a news, a web browser, a message, a phonebook, a memo, a schedule management, and the like. Of course, the allocations are non-limited by this example and can be implemented in more various ways. Contents or data associated with the applications can also exist. In this instance, the associated content or data is stored in the memory 160 or can be stored in an external server having a storage space.

For instance, the contents can include an audio file (associated with the music player), a video file (associated with the video player), a document file (associated with an e-book), and the like. In addition, the data can include a message content (associated with the message), a memo content (associated with the memo), a counterpart information (associated with the phonebook), a schedule content (associated with the schedule management), and the like.

According to an embodiment of the present invention, a mobile terminal can configure a plurality of modes differing from each other in application configuration for data security for one mode against another mode or data security between different modes. In addition, the mobile terminal according to an embodiment of the present invention can implement a plurality of the modes selectively or simultaneously (or sequentially).

When a specific application is executed in a prescribed mode, at least one application interoperable with the specific application can be executed in the prescribed mode. For instance, if a specific application is a voice call, an application interoperable with the voice call can include a phonebook, a message and the like.

Regarding mode discrimination in application configuration, an application executable in each of a plurality of modes can include at least one application (hereinafter named a dedicated application) executable by being dedicated to each of a plurality of the modes or at least one application (hereinafter named a common application) executable in any one of a plurality of the modes. In particular, the common application can change at least one feature in each of a plurality of the modes in which the corresponding application is executable. For instance, at least one of configuration, representation, security and the like of the common application is changeable. This shall be described in detail later.

Of course, the common application may not change its feature in each of a plurality of the modes in which the corresponding application is executable. For instance, if the common application includes such a basic terminal application as a voice call, a message and the like, it may not change its feature.

For example, if first to third applications are executed in a first mode and if the third application, a fourth application and a fifth application are executed in a second mode, the first and second applications, the third application and the fourth and fifth application can be called the dedicated applications of the first mode, the common application of the first and second modes and the dedicated applications of the second mode, respectively.

A plurality of modes can include a first mode (i.e., a private mode) facilitating user's personal life, a second mode (i.e., a business mode) facilitating a user's work life, and the like. This enables a mobile terminal to be discriminatively used in consideration of a user's personal life (e.g., privacy) and a user's public life (e.g., work life). In particular, in aspect of security reinforcement, when either a private mode or a business mode is implemented, restriction can be put on an access to information corresponding to the other mode.

The above-described private mode and the business mode are just the examples for describing a plurality of the modes. If the above-described private mode and the business mode are suitable for the mode discrimination reference mentioned in this disclosure, they are non-limited by their names. Although the mode discrimination of a plurality of the modes is explained in the above description based on the application configuration, it shall be described in detail with reference to the accompanying drawings later.

Implementation and activation of a plurality of modes mentioned in the description of the present invention shall be defined as follows. First of all, according to an embodiment of the present invention, a mobile terminal can implement a plurality of modes all and is also able to activate one of a plurality of the currently implemented modes. For instance, if a plurality of the modes include a first mode and a second mode, the mobile terminal boots an operating system capable of implementing both of the first and second modes to implement and is then able to activate the implemented first or second mode selectively.

In particular, if both of the first and second modes are already implemented, the mode for displaying an executed screen on a current screen, the mode for designating the currently executed application, the mode having a high priority or the like can be called an activated mode. In this instance, a non-activated mode (or a deactivated mode) can be regarded as operating as a background despite being implemented in the mobile terminal. In more particular, if an executed screen of the first mode and an executed screen of the second mode are being displayed on a first region and a second region of the screen through screen partition, respectively, the mode selected by a user, the mode for activating the corresponding region currently, the mode for designating a currently executed application, the mode having a high priority or the like can be regarded as activated.

Occasionally, after the mobile terminal has implemented and activated one mode, if the mobile terminal attempts to switch the current mode to the other mode, the mobile terminal can implement and activate the other mode (i.e., selective implementation and activation of mode).

In the following description, implementation of a plurality of modes and operations of components required for inter-mode switching for a plurality of the modes are explained in detail with reference o FIGS. 3A to 4C.

Figure 3A:
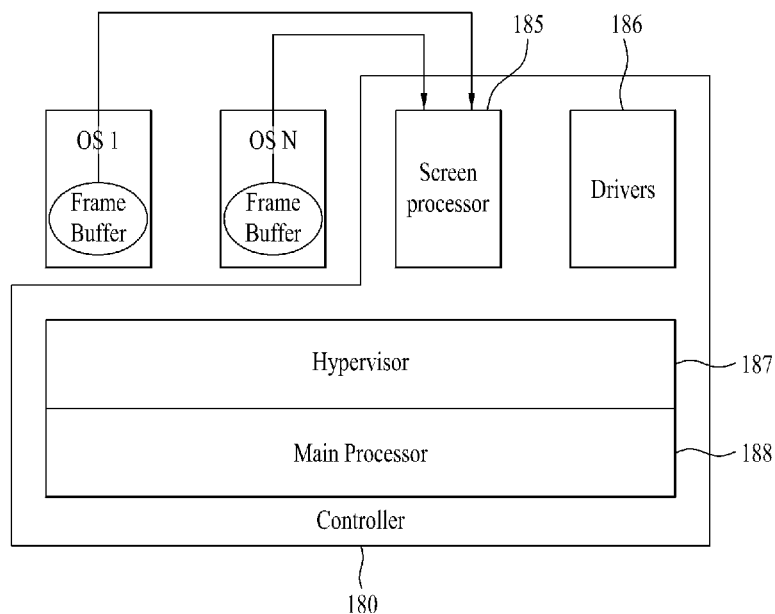
FIGS. 3A to 3C are block diagrams of components required for implementation of a plurality of modes and a mode switching among a plurality of the modes according to an embodiment of the present invention.
Figure 3B:
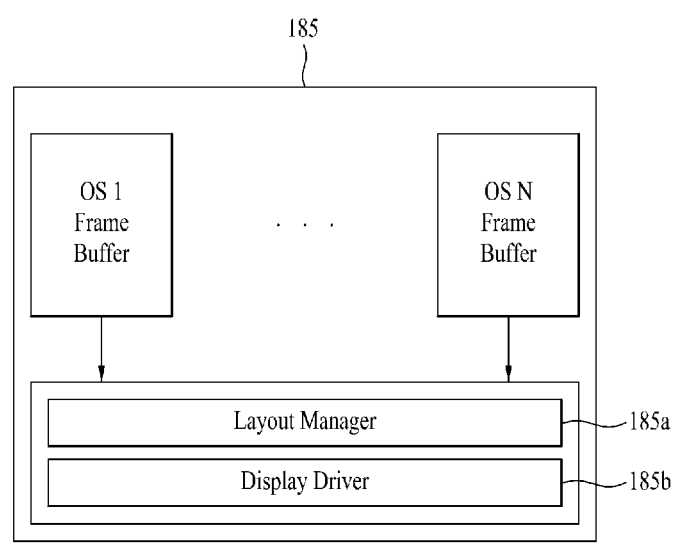
Figure 3C:
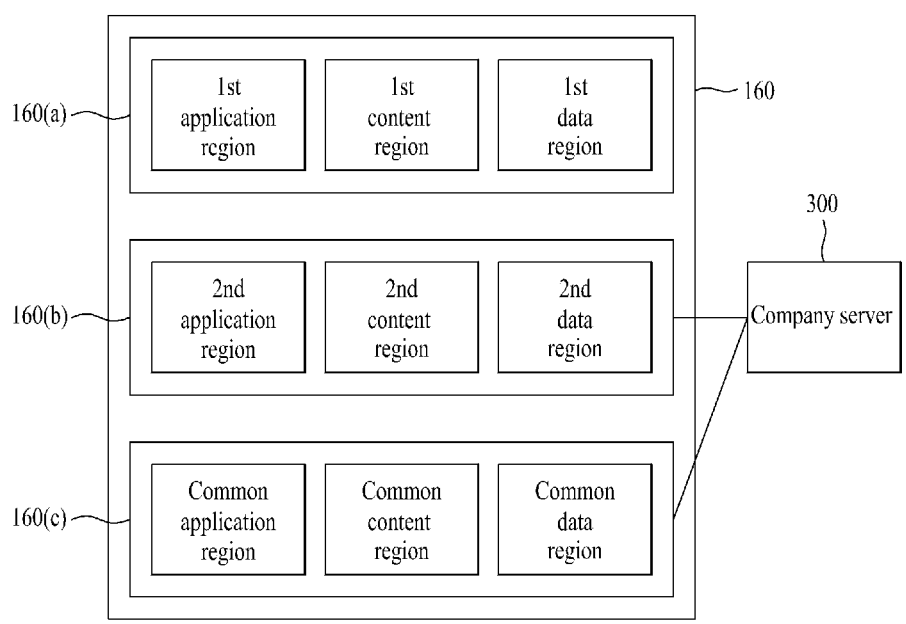

FIGS. 3A to 3C are block diagrams of components required for implementation of a plurality of modes and a mode switching among a plurality of the modes according to an embodiment of the present invention.

FIG. 3A is a block diagram of the controller 180 for driving a plurality of operating systems (OSs) and configuring a dedicated screen of a plurality of operating systems. In addition, FIG. 3B is a block diagram of a screen processor 185 shown in FIG. 3A. In particular, FIGS. 3A and 3B show a plurality of the operating systems provided in parallel with each other (cf. FIG. 4A(a), FIG. 4B).

According to an embodiment of the present invention, a plurality of the modes can be implemented by a plurality of the operating systems, respectively. In particular, the operating system for supporting implementation can differ per mode. Referring to FIG. 3A, the controller 180 can include a screen processor 185, a driver 186, a hypervisor 187 and a main processor 188. In this instance, the hypervisor 187 can be called such a terminology as a virtual engine (virtual machine), a virtualizing module (virtualization), a virtual engine monitor (virtual machine monitor), a virtualization module monitor (virtualization monitor) and the like. This terminology is just exemplary. In addition, a component capable of performing the same function of the hypervisor 187 is non-limited by the corresponding terminology.

A frame buffer is provided to each of a plurality of the operating systems stored in the memory 160. If a plurality of the operating systems are driven, the screen processor 185 receives a frame corresponding to a dedicated screen of the corresponding operating system from each of the frame buffers and then determines whether to display the dedicated screen of a prescribed one of the operating systems on a screen of the display unit 151 under the control of the main processor 188.

Under the control of the main processor 188, the screen processor 185 displays the dedicated screen of the specific operating system on the whole screen of the display unit 151 (e.g., when implementing one mode only). Alternatively, the screen processor 185 generates one integrated frame by combining and/or editing the frames received from the frame buffers and is then able to display an integrated dedicated screen including all the dedicated screens of a plurality of the operating systems (e.g., when implementing a plurality of the modes).

Referring to FIG. 3A, a plurality of the operating systems OS1, . . . OS N are prepared in parallel with each other, which can be described in detail with reference to FIGS. 4A(a) and 4B as follows. FIGS. 4A(a) and 4B show a scheme of booting a plurality of operating systems Guest OS 1 and Guest OS 2 respectively supporting different modes in parallel by loading a hypervisor (hereinafter named a first scheme).

Figure 4B:
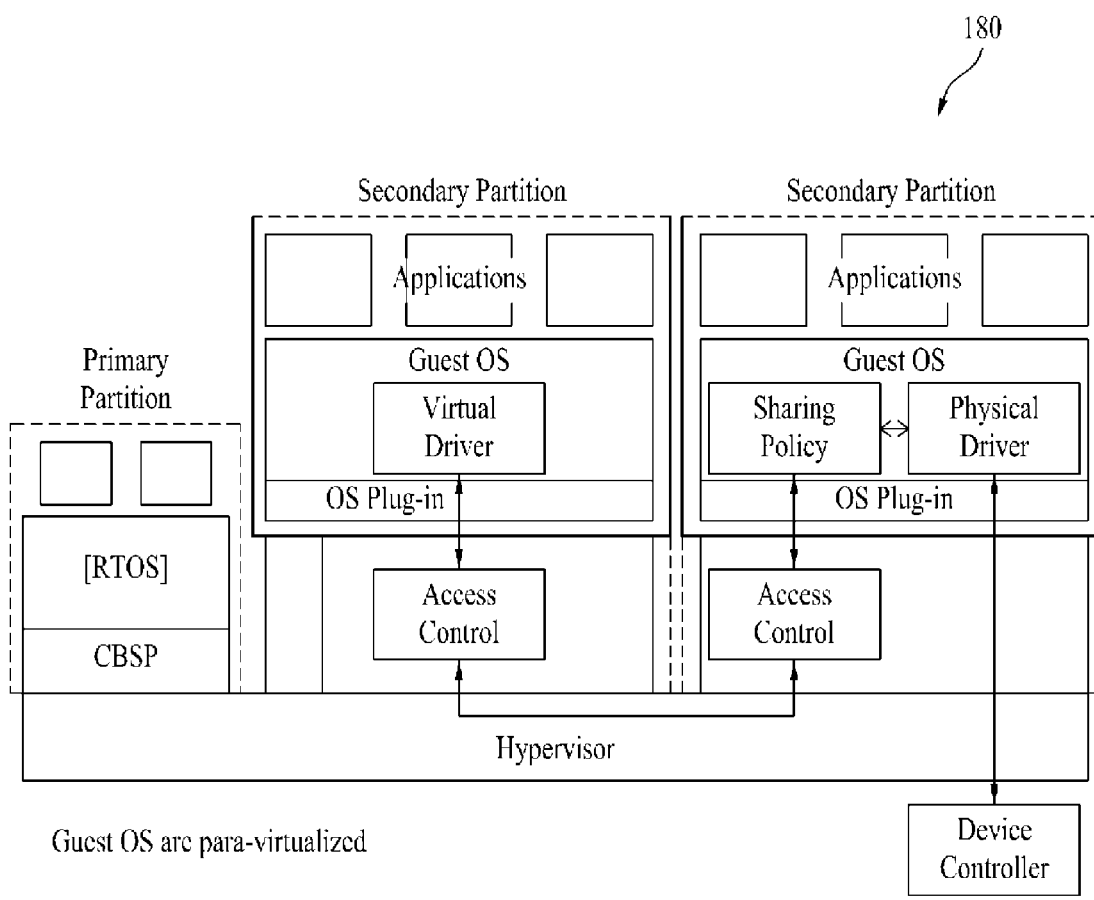

Referring to FIGS. 4A(a) and 4B, the mobile terminal 100 can implement Guest OS 1 and Guest OS 2 selectively, sequentially or simultaneously. In addition, a different mode can be designated to each of the Guest OS 1 and the Guest OS 2. In this instance, the operation of the Guest OS 1 and the Guest OS 2 and the corresponding mode activation can be performed by the hypervisor. The components shown in FIG. 4B can perform general operations related to the virtualization engine technology.

Multi-OS booting and mode activation corresponding to the multi-OS booting are described in detail as follows. First of all, in case (1) of activating a mode corresponding to the currently booted Guest OS 1 or Guest Os 2 or in case (2) of booting the Guest OS 1 corresponding to first mode and the Guest OS 2 corresponding to a second mode sequentially or simultaneously, the controller 180 (particularly, the hypervisor) implements and activates either the first mode or the second mode (2-1) or can activate either the first or second mode despite implementing both of the first and second modes (2-2).

Referring now to FIG. 3, the screen processor 185, includes a layout manager 185a and a display driver 185b (FIG. 3B). Under the control of the main processor 188, the layout manager 185a generates one integrated frame by combing or editing the frames received from the frame buffers and the display driver 185b then controls the frame generated by the layout manager 185a to be displayed on the display unit 151.

The driver 186 controls the entire operating systems to be driven. The hypervisor 187 is a middleware between the main processor 188 and each of the operating systems and includes a virtualization engine configured to a plurality of the operating systems to be usable in the mobile terminal 100 according to an embodiment of the present invention. In addition, the main processor 188 controls all operations related to the driving of a plurality of the operating systems according to an embodiment of the present invention.

As mentioned in the above description, the screen processor 185, the driver 186, the hypervisor 187 and the main processor 188 can be included in the controller 180 or can be stored as software in the memory 160. Further, FIG. 3C is a block diagram of the memory 160 having a database storage region corresponding to each of a plurality of the modes.

According to an embodiment of the present invention, the mobile terminal can manage the database storage regions of a plurality of the modes discriminatively. In particular, when a plurality of the modes are implemented by the different operating systems, respectively, the mobile terminal can manage the database storage regions of a plurality of the modes discriminatively.

Generally, when at least one operating system capable of implementing a first mode and a second mode is provided, the memory 160 can store an application corresponding to each of the at least one operating system. Therefore, the provided at least one or more operating systems can be booted selectively or simultaneously under the control of the controller 180.

For instance, the operating system can include such a commercial OS as Android OS, Linux based OS, Windows Mobile OS, Apple OS and the like. In addition, a dedicated application can be differently set for each of the operating systems. In addition, a multi-OS can include different kinds of operating systems (e.g., Android OS, Apple OS, etc.) and the same kinds of operating systems (e.g., 2.1 version of Android OS, 2.2 version of Android OS, etc.) differing from each other in version.

According to an embodiment of the present invention, assuming that both of the first mode and the second mode can be implemented, the memory 160 can include a first database storage region 160($a$) corresponding to the first mode, a second database storage region 160($b$) corresponding to the second mode, and a common database storage region 160($c$) in common with the first mode and the second mode. Occasionally, the common database storage region 160($c$) can be omitted. In this instance, a commonly-designated application and content or data associated with the corresponding application can be stored in the database storage region of the corresponding mode.

In particular, in configuring the first, second and common database storage regions, the mobile terminal 100 uses memories different from each other in hardware as the storage regions, puts restriction on accessing the storage regions per mode despite providing the storage regions within a same memory, or can discriminate the storage regions from each other using a storage partition per mode.

In this instance, the same operating system implements the first mode and the second mode or different operating systems can implement the first mode and the second mode, respectively. Moreover, at least two or modes can be implemented by the mobile terminal 100. If so, the database storage regions can be further subdivided.

In particular, the first database storage region 160($a$) can include a region (i.e., a first application region) for storing at least one first application executable in the first mode, a region (i.e., a first content region) for storing a content associated with the first application and a region (i.e., a first data region) for storing data associated with the first application.

In addition, the second database storage region 160($b$) can include a region (i.e., a second application region) for storing at least one second application executable in the second mode, a region (i.e., a second content region) for storing a content associated with the second application and a region (i.e., a second data region) for storing data associated with the second application.

Moreover, the common database storage region 160($c$) can include a region (i.e., a common application region) for storing at least one common application executable in both of the first mode and the second mode, a region (i.e., a common content region) for storing a content associated with the common application and a region (i.e., a common data region) for storing data associated with the common application.

When the second mode is a business mode that facilitates a user's public life, information stored in the second database storage region 160($b$) and information corresponding to the second mode in the common database storage region 160($c$) can be utilized only if the corresponding information is stored in a manner of being shared with a company server 300, the corresponding information is stored in the company server 300 (i.e., the second database storage region 160($b$) is unnecessary) or the company server 300 is accessed. In this instance, the company server 300 can include a server of a company, for which a user works, a server of a specific company designated by a user (or a company where the user works), or the like.

While the first mode is activated, the mobile terminal 100 can utilize the information stored in the first database storage region 160($a$) and the information corresponding to the first mode in the common database storage region 160($c$). While the second mode is activated, the mobile terminal 100 can utilize all the information stored in the first, second and common database storage regions 160($a$), 160($b$) and 160($c$).

Alternatively, while the second mode is activated, the mobile terminal 100 can utilize the information stored in the first database storage region 160($a$) and the information corresponding to the second mode in the common database storage region 160($c$). While the first mode is activated, the mobile terminal 100 can utilize all the information stored in the first, second and common database storage regions 160($a$), 160($b$) and 160($c$).

Optionally, it can control the mobile terminal 100 not to utilize the information on the first mode in the course of the activated second mode. Besides, although the drawing shows that the application region, the content region and the data region are situated in the database storage region, the application region, the content region and the data region can be integrated together if necessary.

FIGS. 4A(b) and 4C show a scheme of driving a hypervisor on a Host OS for supporting one mode to boot a Guest OS for supporting another mode (hereinafter named a second scheme). In particular, a mode supported by the Host OS can include a private mode. In addition, a mode supported by the Guest OS can include a business mode.

Figure 4C:
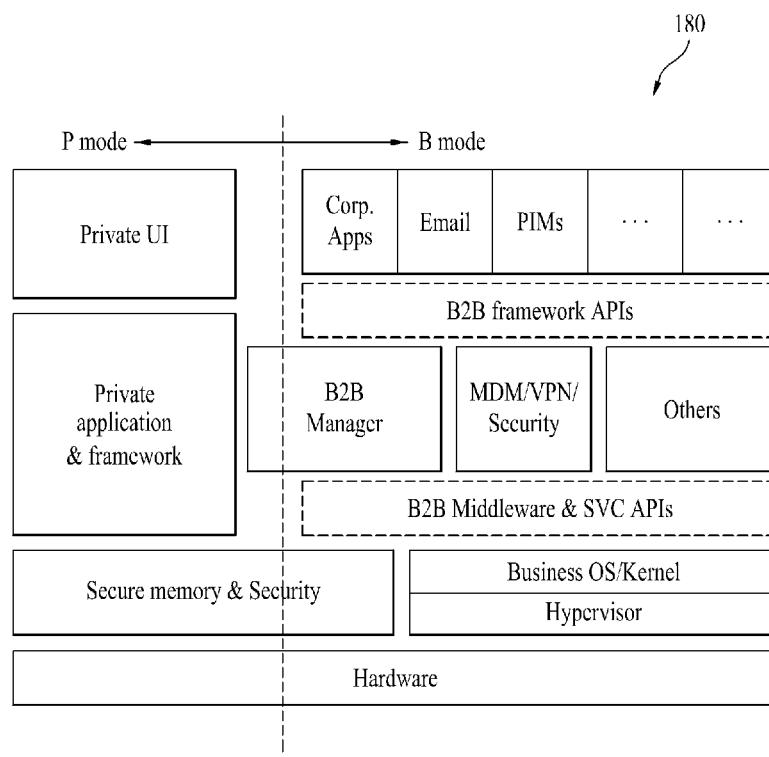

In more particular, referring to FIG. 4C, a B2B manager can perform a switching operation between a private mode (hereinafter abbreviated a P mode) and a business mode (hereinafter abbreviated a B mode). Components shown in a P mode region of the two regions partitioned by a dotted line can operate when the private mode implementation, components shown in the B mode region can operate when the business mode implementation, and components included in both of the modes can operate in both of the modes.

According to an embodiment of the present invention, the mobile terminal 100 can implement a plurality of modes on an operating system selectively, simultaneously or sequentially. A different operating system (hereinafter named an individual operating system) is designated to each of a plurality of the modes or a common operating system can be designated to a plurality of the modes. Specifically, implementation of a plurality of the modes can be controlled by the hypervisor 187.

In particular, a currently implemented or activated mode in accordance with an individual or common operating system is defined as follows. For clarity and convenience of the following description, assume that a plurality of modes include a first mode and a second mode. Of course, at least two or more modes can exist if necessary.

First of all, when a common operating system is booted, the controller 180 implements and activates either the first mode or the second mode (1) or can activate either the first mode or the second mode despite implementing both of the first and second modes.

When an individual operating system is booted, the controller implements and activates a mode corresponding to a currently booted individual operating system (1), implements and activates a mode corresponding to one of he first mode and the second mode when booting a first operating system corresponding to the first mode and a second operating system corresponding to the second mode sequentially or simultaneously (2-1), or activates either the first mode or the second mode despite implementing both of the first mode and the second mode (2-2).

In the following description, how to discriminate a plurality of modes from each other is explained in detail. First of all, according to an embodiment of the present invention, each of a plurality of modes can be discriminated by at least one of a mode indicator, a database storage region, an operating system, a user access authority, an application configuration, a content configuration, a data configuration, an application feature, an application group, a group identifier and the like.

Discriminating a plurality of modes using a mode indictor according to a first embodiment is explained as follows. First of all, each of a plurality of modes can have an indicator different to indicate a corresponding mode. An indicator per mode is basically stored in the mobile terminal 100 or can be downloaded from an external server or an external terminal. The indicator per mode is set or selected by a user or can be randomly set by the controller 180.

For instance, each of a plurality of the modes can have a different one of a mode icon, a mode image, a background image, a background color/brightness, a letter font/color/size, a home screen picture (number of pages and page indicator included), an application arrangement structure (e.g., the number of applications included in one home screen, etc.), an application identifier, an LED color, an alarm sound such as a bell sound and the like, a keypad type (backlight color of keypad included), a mode switching key zone, a group identifier (described later) and the like. Of course, those examples of the mode indicator are just exemplary and can include all display elements for discriminating a mode.

This is explained in detail with reference to FIGS. 5A to 5D. For clarity and convenience of the following description, assume that a first mode and a second mode include a private mode and a business mode, respectively. In addition, assume that either the private mode or the business mode is in an active state.

FIGS. 5A to 10C are diagrams for discriminating a plurality of modes according to an embodiment of the present invention. Referring to FIG. 5A, if a personal mode is currently activated, the mobile terminal 100 can display an icon (P mode) 501 corresponding to the private mode on a prescribed region of a screen (FIG. 5A(a)). If a business mode is currently activated, the mobile terminal 100 can display an icon (B mode) 502 corresponding to the business mode on a prescribed region of a screen (FIG. 5A(b)).

Referring to FIG. 5B, the mobile terminal 100 includes a mode switching key region 510 provided to a prescribed region of the screen. If the private mode is currently activated, the mobile terminal 100 can discriminatively display a zone (P) 511 corresponding to the private mode in the mode switching key region 510 (FIG. 5B(a)). If the business mode is currently activated, the mobile terminal 100 can discriminatively display a zone (B) 512 corresponding to the business mode in the mode switching key region 510 (FIG. 5B(b)).

Referring to FIG. 5C, a private mode zone 521, a business mode zone 522 and a switching command zone 523 are provided to the screen of the mobile terminal 100. If the private mode is currently activated, the mobile terminal 100 can discriminatively display the private mode zone (P) 521 (FIG. 5C(a)). If the business mode is currently activated, the mobile terminal 100 can discriminatively display the business mode zone (B) 522 (FIG. 5C(b)).

Referring to FIG. 5D, if the private mode is currently activated, the mobile terminal 100 can display an announcement window 531 for announcing events (e.g., email, message, call, etc.) occurring in association with the business mode or the number of the events (or, occurrence time, counterpart information, etc.) on a prescribed region of the screen (FIG. 5D(a)). If the business mode is currently activated, the mobile terminal 100 can display an announcement window 532 for announcing events (e.g., email, message, call, etc.) occurring in association with the private mode or the number of the events (or, occurrence time, counterpart information, etc.) on a prescribed region of the screen (FIG. 5D(b)).

In the following description, discriminating a plurality of modes using a database storage region according to a second embodiment is explained.

First of all, a plurality of the modes can discriminatively have database storage regions within the memory 160, respectively (cf. FIG. 3C). Each of a plurality of the modes can utilize the information stored in the corresponding database storage region or the corresponding information stored in the common database storage region only. Moreover, it can set the information on one mode not to be utilized in other modes. Besides, one (e.g., business mode) of a plurality of the modes can utilize information on another mode (e.g., private mode), whereas the latter mode can be set not to use the information on the former mode.

If the information on the first mode can be utilized in the second mode (yet, the first mode is unable to utilize the information on the second mode), it can be said that an access restriction is put on the second mode or that a higher security level is set on the second mode (described later).

This is explained in detail with reference to FIGS. 6A to 7B as follows. For clarity and convenience of the following description, assume that a first mode and a second mode include a private mode and a business mode, respectively. Assume that either the private mode or the business mode is in an active state. In addition, assume that a common application of the first and second modes is currently executed.

Figure 6A:
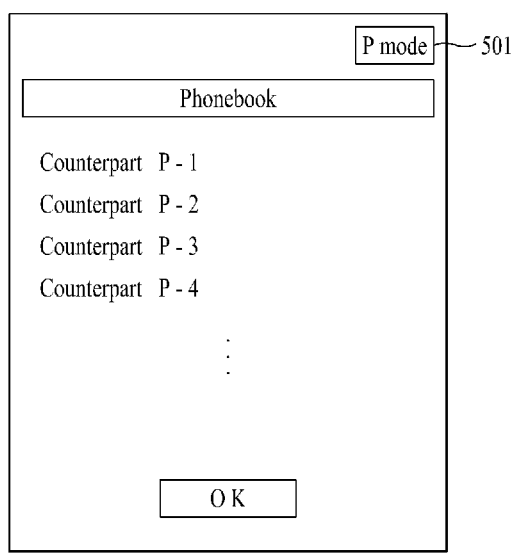

Referring to FIG. 6A, when a phonebook (example of a common application) is being executed in the private mode, the mobile terminal 100 extracts counterpart information corresponding to the private mode from counterpart information associated with the phonebook only and is then able to display the extracted counterpart information.

Referring to FIG. 6B, when executing a phonebook in the private mode, the mobile terminal 100 extracts counterpart information corresponding to the business mode from counterpart information associated with the phonebook and then displays the extracted counterpart information (FIG. 6B(a)). Alternatively, the mobile terminal 100 extracts counterpart information corresponding to either the private mode or the business mode and is then able to display the extracted counterpart information (FIG. 6B(b)).

In particular, FIG. 6B(b) shows a zone (All) 603 activated. If a privacy zone (P) 601 is activated, the mobile terminal 100 can selectively display the counterpart information corresponding to the private mode only. If a business zone (B) 602 is activated, the mobile terminal 100 can selectively display the counterpart information corresponding to the business mode only.

Figure 7A:
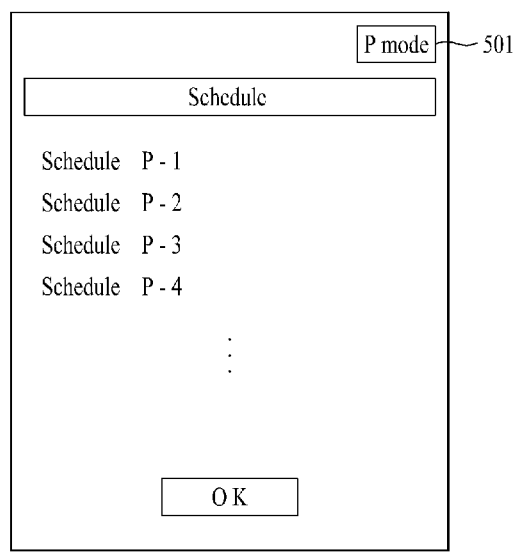

Referring to FIG. 7A, when a schedule management (example of a common application) is being executed in the private mode, the mobile terminal 100 extracts schedules corresponding to the private mode from schedules associated with the schedule management only and is then able to display the extracted schedules.

Referring to FIG. 7B, when executing a schedule management in the private mode, the mobile terminal 100 extracts schedules corresponding to the business mode from schedules associated with the schedule management and then displays the extracted schedules (FIG. 7B(a)). Alternatively, the mobile terminal 100 extracts schedules corresponding to either the private mode or the business mode and is then able to display the extracted schedules (FIG. 7B(b)).

In particular, FIG. 7B(b) shows a zone (All) 703 activated. If a privacy zone (P) 701 is activated, the mobile terminal 100 can selectively display the schedules corresponding to the private mode only. If a business zone (B) 702 is activated, the mobile terminal 100 can selectively display the schedules corresponding to the business mode only.

Specifically, referring to FIGS. 6A to 7B, although the private mode is unable to access the information on the business mode or the database storage region storing the information on the business mode, the business mode can freely access the information on the private mode or the database storage region storing the information on the private mode.

According to a third embodiment, each of a plurality of modes can be discriminated by a corresponding user access authority. For clarity and convenience of the following description, assume that a plurality of the modes include a first mode and a second mode.

Regarding each of a plurality of the modes, as a different security level is set, a user access authority can be changed (1). Regarding each of a plurality of the modes, if an access restriction is put on one mode but an access restriction is not put on the other mode, a user access authority can be changed (2).

For this, in order to enter a specific one of a plurality of the modes, an authentication procedure can be requested. Hence, the specific mode can be entered only if a valid authentication procedure is performed to enter the specific mode. In particular, if an access restriction or a security level over a predetermined reference is put on the specific mode, an authentication procedure can be requested.

For instance, in a mode having a high user access authority, information corresponding to a mode having a low user access authority or a database storage region of the corresponding information is freely accessed and can be freely utilized. On the contrary, in a mode having a low user access authority, it is unable to access information corresponding to a mode having a high user access authority or a database storage region of the corresponding information.

When entering or switching to a mode having a high user access authority, an input of a user authentication information is requested. If a valid user authentication information is input, the mobile terminal 100 can enter or switch to the mode having the high user access authority (example of an authentication procedure). When a mode having a low security level, the mobile terminal 100 is requested to input a user authentication information (e.g., name, social security number, etc.) of a low level. When a mode having a high security level, the mobile terminal 100 is requested to input a user authentication information (e.g., name, social security number, specific touch pattern, specific password, etc.) of a high level.

Regarding management (e.g., input, inquiry, editing, etc.) of information (e.g., content, data, etc.) on an application in accordance with a user access authority, three kinds of cases are described in detail as follows. For clarity and convenience of the following description, assume that a plurality of modes include a first mode and a second mode.

First of all, according to a first case, there can exist applications to which contents or data can be input regardless of a mode. For instance, the content or data inputtable application can include such an application for performing a basic function in using a terminal as a schedule management, a scheduler, an email, a message, a messenger, a conference call, a video call, an internet, a phonebook and the like.

According to a second case, like the first case, information input is possible without mode discrimination. Yet, it can discriminate a database storage region per mode (cf. FIG. 3C).

In particular, inter-mode information exchange is impossible but unilateral information exchange is possible. For instance, information transfer from a private mode to a business mode is possible but information transfer from a business mode to a private mode is impossible. In another instance, by setting a plurality of modes to different security levels, respectively, information transfer from a low level to a high level is possible but information transfer from a high level to a low level is impossible.

When a specific situation, an external terminal having a predetermined authority in a remote place deletes information (e.g., application, content, data, etc.) on a specific mode only or can shut down the specific mode itself. For instance, the specific situation can include one of an employee taking out a terminal without authorization, a terminal being stolen, an unregistered storage medium being loaded in a terminal, a terminal accessing an unsubscribed network, and the like.

Furthermore, regarding a user access authority, it can differentiate an authority for accessing an application, a content, a data or the like, which is available for a business mode, in accordance with a user level (e.g., the user level is determined in consideration of rank in company, duty attribute in company, department in company, etc.) of the mobile terminal 100. In addition, it is also able to differentiate a function for a specific application. For instance, when a user level (e.g., a group head) is equal to or higher than a predetermined reference, an approval grant function is usable. Yet, when a user level (e.g., a company employee) is lower than a predetermined reference, an approval grant function is deactivated. Moreover, the same application can have a usable content/data that differs in accordance with a user level or the same content/data can have a different range of the provided information in accordance with a user level (e.g., a different data field can be configured in accordance with a user level). Besides, in accordance with a user's authority, an icon associated with a job failing to belong to the corresponding authority is not displayed on a terminal itself. Even if the icon is displayed on the terminal, it can be set not to be executed.

According to a third case, there can exist application (e.g., dedicated applications) accessible to corresponding information as well as operable in either a first mode or a second mode.

For instance, for security matters in a business mode, a photographing function is restricted, a conditional access to a network is granted, or a print function is blocked. When the business mode, a business related application is provided. When a private mode, the business related application may not be provided. Of course, when the private mode, a privacy related application is provided. When the business mode, the privacy related application may not be provided.

Meanwhile, there can exist a content or application specialized in a unilateral mode only. For instance, the application specialized for the business mode can include a company business related application. In addition, the company business related application can perform a function of an upload to a company server, a function of a download to the company server and the like.

In addition, it can put an access restriction (or entry) per mode in accordance with a place or time. For instance, it can set a business mode not to be entered at home. In another instance, it can set a private mode not to be entered on a specific time zone. Occasionally, a separately authorized person can enter the business mode at home or the private mode at office on a specific time zone.

Moreover, since an interface is provided to be shared with users in the business mode, information can be shared with the users. If the business mode is switched to the private mode, the interface provided for the information sharing can be shut down.

Furthermore, there can exist one hardware module (e.g., a common module) usable for a plurality of modes in common or another hardware module (e.g., a dedicated module) usable for a specific one of a plurality of the modes. Hence, if a first mode is currently activated, a common module and a dedicated mode of the first mode are activated, while a dedicated module of a second module is not activated. In this instance, the common module and the dedicated module are designated in accordance with a user selection or can be designated by a decision made by the controller 180 or the company server 300.

For instance, assuming that a first mode and a second mode are a private mode and a business mode, respectively, a common module can include one of a mobile communication module 112 for call and message transmission and reception, a power supply unit 190, a display unit 151, a memory 160 and the like. A dedicated module of the private mode can include one of a camera 121, a position location module 115 and the like. In addition, a dedicated module of the business mode can include a projector module 155 or the like. The above examples of the communication module and the dedicated module are just exemplary, by which the communication module and the dedicated module are non-limited. In addition, the communication module and the dedicated module can be configured in more various ways.

In the following description, a user access authority is explained in detail with reference to FIGS. 8A and 8B. For clarity and convenience of the following description, assume that the same content is accessed.

Referring to FIG. 8A, when a document 1 (example of content) is accessed in a private mode, the mobile terminal 100 can grant 'read authority' for the document 1 (FIG. 8A(a)). When a document 1 is accessed in a business, the mobile terminal 100 can grant 'read authority, delete authority, edit authority' for the document 1 (FIG. 8A(b)). Moreover, if a user is authorized over a predetermined level in a company, an approval authority can be granted to the user for the document 1 that requires approval or authorization.

Referring to FIG. 8B, when a file 1 (example of content) corresponding to a business mode is selected from a file list in a private mode (FIG. 8B(a)), the mobile terminal 100 informs a user that there is no access authority on the file 1 and enables the user to select whether to switch the private mode to the business mode to check the file 1 (FIG. 8B(b)).

Of course, when the private mode in FIG. 8B, a file corresponding to the business mode may not be included in the file list. In addition, it can display an indictor, which indicates that the file corresponds to the privacy/business mode, on the file list.

Although the user access authority is set per mode in the above description, it can be set per application, content or data if necessary. Therefore, a user authorized with the user access authority can check the same content, whereas an unauthorized user is unable to check the same content.

According to a fourth embodiment, each of a plurality of modes can be discriminated in accordance with at least one of an application configuration, a content configuration and a data configuration.

Each of a plurality of the modes can configure an application different per mode. Even if an application is a common application, each of a plurality of the modes can configure a content or data corresponding to the application differently.

In this instance, if the configuration of the application is different, it means that at least one application (hereinafter named a first dedicated application) dedicated to a first mode and at least one application (hereinafter named a common application) in common with the first mode and a second mode are executed in the first mode or it can mean that at least one application (hereinafter named a second dedicated application) dedicated to the second mode and at least one application (hereinafter named a common application) in common with the first mode and the second mode are executed in the second mode (cf. FIG. 10C).

If the configuration of the content/data is different, it can include both a substance of the content/data being different and a substance of the content/data being different in part. Specifically, the latter instance can mean that a substance of a specific content corresponding to each of the first mode and the second mode is different even if the specific content is designated to both of the first mode and the second mode. This is enabled in a manner of configuring a data field different per mode for the same content or data.

This is explained in detail with reference to FIGS. 9A and 9B as follows. Referring to FIG. 9A, in storing the same counterpart information, the mobile terminal 100 designates different contacts 911 and 921 and different emails 912 and 922 to a private mode and a business mode, respectively, further designates a blog address 913 and a birthday information 914 to the private mode, and further designates an approval authority 923, a rank 924 and a department 925 to the private mode.

Referring to FIG. 9B, in storing the same schedule, even if a content and participant information 931 and a content and participant information 941 are identically designated to a private mode and a business mode, respectively, the mobile terminal 100 can further designate a time information 932 to the private mode and is also able to further designate a conference room information 942 and a notification 943 to the business mode.

Figure 10A:
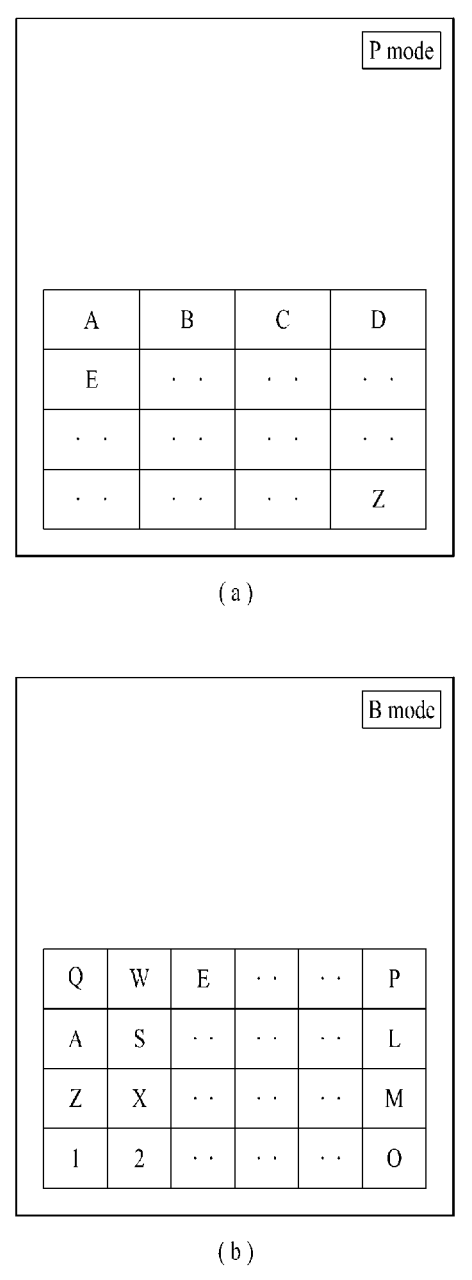

The mobile terminal 100 can set a keypad type different per mode (FIG. 10A) or can set a time zone different per mode (FIG. 10B). The mobile terminal 100 can set a different application and a different backup level of information associated with the application per mode. For instance, the mobile terminal 100 backs up information of a recent week in the private mode and is also able to back up information of a recent month or real-time information in the business mode. Of course, the backup level per mode is set by a user or can be randomly set by the controller 180.

In particular, in the business mode, if a counterpart terminal is not in the business mode or a working hour (or a holiday) currently in consideration of a status (e.g., a currently activated mode, a current location, a time zone, etc.) of the counterpart terminal, with which the mobile terminal 100 currently attempts to contact, the mobile terminal 100 informs a user of the unavailability of the counterpart terminal to enable the user to select whether to make a contact. In doing so, the mobile terminal 100 can receive information indicating the status of the counterpart terminal from the counterpart terminal or a company server and is then able to obtain the status of the counterpart terminal using the received information.

In the business mode, it can modify all previously-stored schedules to be fitted to a currently belonging time zone by reflecting a current time zone (in an event that a time zone is changed).

When there is no user input action made for a predetermined period of time in the business mode, it can lock or shut down the business mode automatically or in accordance with a user selection. In this instance, in order to unlock the locked state or cancel the shutdown, a user authentication information corresponding to the business mode is input or an authentication should be granted by the company server. Moreover, in the business mode, when an overseas roaming function is loaded on a user terminal, if a current location of a user is domestic, the overseas roaming function is automatically deactivated. If a current location of a user is overseas, the overseas roaming function can be automatically activated.

According to a fifth embodiment, when at least one common application is executed, each of a plurality of modes can vary its feature to correspond to a currently activated mode. In other words, when a specific application is a common application of a first mode and a second mode, the feature of the specific application can vary in accordance with whether the currently activated mode is the first mode or the second mode.

In this instance, if a feature varies per mode, it can mean that a configuration (e.g., a corresponding content/data configuration included), display or security of an application is varied.

For instance, if a feature varies per mode, it ca mean that a structure (e.g., configuration of a corresponding menu item) of an application, an executed screen (e.g., background image, letter type, letter size, provided information, etc.) of an application, a configuration of content/data associated with an application (cf. FIG. 9A, FIG. 9B), an application function, a security of an application (or, content, data, etc.) or the like is different per mode. Of course, as the examples of the application features are just exemplary, any case of configuring a common application to be different per mode is applicable to the present embodiment.

For instance, when the application function is different, a photographing function is allowed to a camera in a private mode but may not be allowed in a business mode. In another instance, when an authority of access to an application is different, a phonebook provides a counterpart name, a phone number and a personal email address in a private mode and can further provide a company email address, a rank, a department and an approval authority information in a business mode.

This is explained in detail with reference to FIG. 10C as follows. For clarity and convenience of the following description, assume that a plurality of modes include a private mode and a business mode. Referring to FIG. 10C, the mobile terminal 100 can receive an input of an execution command signal for executing a phonebook (i.e., an example of a common application) from a user.

The mobile terminal 100 determines a mode activated at the input timing point of the execution command signal. If a private mode is currently activated, the mobile terminal 100 executes the phonebook in accordance with a feature corresponding to the private mode and then displays an executed screen of the phonebook (cf. FIG. 6A or 9A(a)). On the contrary, if a business mode is activated, the mobile terminal 100 executes the phonebook in accordance with a feature corresponding to the business mode and then displays an executed screen of the phonebook (cf. FIG. 6B or 9A(b)).

For instance, a security of an application being different is explained as follows. First of all, when attempting to execute a common application in a first mode, an authentication procedure is not requested or a low-level security set authentication information needs to be input. Yet, when attempting to execute a common application in a second mode, an authentication procedure is requested or a high-level security set authentication information should be input. In doing so, the application execution can include an output of content or data associated with the application as well as an executed screen display of the application.

According to a sixth embodiment, a plurality of modes can be discriminated from each other using user information corresponding to the modes, respectively. In this instance, the user information can include a user name (or title), a user image, a user phone number, a user email address, a user blog address and the like.

For instance, first and second user information different from each other can be set for first and second modes, respectively. In particular, when a first phone number and a second phone number (e.g., dual SIM) are assigned to the mobile terminal 100, the first phone number and the second phone number can be set for the first mode and the second mode, respectively.

In the above description, the definitions of the modes mentioned in the disclosure are explained. In addition, when a plurality of modes exist, the method of discriminating a plurality of the modes is explained as well.

According to a seventh embodiment, each of a plurality of modes can be discriminated by an application group including at least one application executed in the corresponding mode.

For instance, when at least one application is executable in each of a plurality of modes, the controller 180 can configure an application group including executable application(s) per mode. Moreover, the application group can be configured in accordance with an application type as well as the corresponding mode. For example, if an application type is a call, call related applications are included in the corresponding application group. If an application type is a camera, camera related applications can be included in the corresponding application group.

Moreover, the mobile terminal 100 displays a per-mode group identifier corresponding to a per-mode application group on the screen. If a specific group identifier is selected, the mobile terminal 100 can display indicators of applications belonging to the corresponding application group or can switch a current mode to a mode corresponding to the specific group identifier (assuming that it is not a currently activated mode).

According to an embodiment of the present invention, the mobile terminal 100 can designate at least one of a function, application, content and data to each of a plurality of modes. The mobile terminal 100 is then able to run at least one of the designated function, application, content and data in a corresponding mode. Moreover, the mobile terminal 100 can put restriction of editing or shift to a different mode on at least one of the function, application content and data designated to a prescribed mode.

This shall be described in detail with reference to the accompanying drawings. For clarity and convenience of the following description, assume that a plurality of modes include a first mode and a second mode. Occasionally, assume that the first mode and the second mode include a business mode and a private mode, respectively.

FIG. 11 is a diagram of information configuration in a business mode and a private mode according to an embodiment of the present invention.

Referring to FIGS. 11, $1^{st}$ to $4^{th}$ applications dedicated to a business mode and data or contents related to the $1^{st}$ to $4^{th}$ applications are designated to the business mode (i.e., dedicated region of business mode). In addition, $10^{th}$ and $11^{th}$ applications and data or contents related to the $10^{th}$ and $11^{th}$ applications can be designated in common with a private mode and the business mode (i.e., common region of business mode).

In addition, $5^{th}$ to $8^{th}$ applications dedicated to the private mode and data or contents related to the $5^{th}$ to $8^{th}$ applications are designated to the private mode (i.e., dedicated region of private mode). In addition, the $10^{th}$ and $11^{th}$ applications and data or contents related to the $10^{th}$ and $11^{th}$ applications can be designated in common with the private mode and the business mode (i.e., common region of private mode).

In particular, the common application of the private and business modes is executable in both of the private and business modes. The content or data related to the common application is set different per mode or can be set identical irrespective of the corresponding mode.

The dedicated application of the private or business mode is executable in the corresponding mode only. In addition, the content or data related to the dedicated application can be referred to in the corresponding mode only. Meanwhile, a function, application content or data, which is not related to an application, can be designated in a manner of dedicated to the private or business mode or in common with both of the private and business modes.

Figure 12:
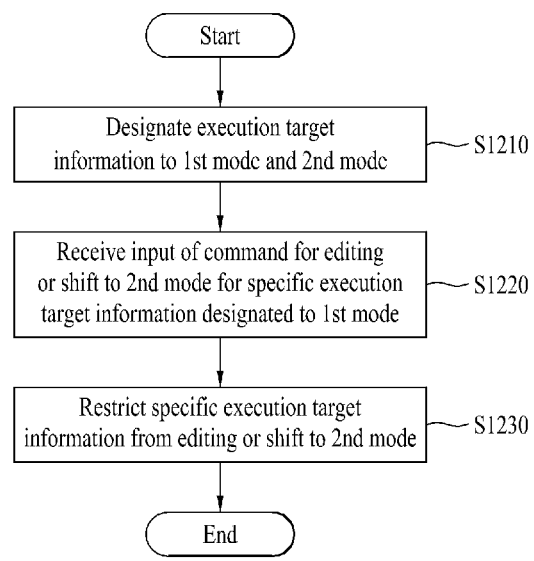
FIG. 12 is a flowchart for a method of managing information in a mobile terminal according to one embodiment of the present invention.

FIG. 12 is a flowchart for a method of managing information in a mobile terminal according to one embodiment of the present invention. Prior to the detailed description with reference to FIG. 12, mode implementation and activation of a mobile terminal according to an embodiment of the present invention shall be explained as follows.

First of all, the mobile terminal 100 implements a first mode and a second mode and is then able to selectively activate one of the implemented first and second modes. In particular, although both of the first and second modes are implemented, the mobile terminal 100 can activate one of the first and second modes.

In particular, in the implementing step, if an operating system is designated per mode, the controller 180 can implement the first mode and the second mode using a first individual operating system and a second individual operating system (i.e., a first OS and a second OS in multi-OS) corresponding to the first mode and the second mode, respectively. If an operating system per mode is common, the controller 180 can implement the first mode and the second mode using a common operating system (i.e., a single OS).

In the following description, a mode activated when OS booting per multi-OS type (cf. FIGS. 4A to 4C) is explained in detail.

First of all, multi-OS types can include a first multi-OS type (e.g., Guest OS 1 and Guest OS 2 included: This type corresponds to a first scheme) and a second multi-OS type (e.g., Host OS and Guest OS: This type corresponds to a second scheme). Assume that Guest OS 1 or Host OS corresponds to a private mode. In addition, assume that Guest OS 2 or Guest OS corresponds to a business mode.

According to the first multi-OS type, if the hypervisor included in the controller 180 is driven, the mobile terminal 100 can boot Guest OS 1 and Guest OS 2 simultaneously or sequentially. If a specific one of a private mode and a business mode is selected by a user or the controller 180, the mobile terminal 100 can activate the specific mode on the Guest OS corresponding to the selected specific mode. Meanwhile, when the specific mode selecting step is omitted, the mobile terminal 100 can activate the private mode using the Guest OS 1 designated as default.

According to the second multi-OS type, the mobile terminal 100 preferentially boots the Host OS corresponding to the private mode and is then able to preload the Guest OS corresponding to the business mode, under the control of the controller 180. The mobile terminal 100 activates the private mode on the Host OS. When the pre-loaded Guest OS is booted, the mobile terminal 100 can activate the business mode on the Guest OS. Meanwhile, the mobile terminal 100 can post-load the Guest OS.

In doing so, when pre-loading the Guest OS, an initial OS booting takes a considerable time. Yet, since two operating systems are already booted after completion of the booting, a mode switching can be quickly performed. When post-loading the Guest OS, an initial OS booting is quickly performed. Yet, when switching a current mode to a mode corresponding to the Guest OS, it may take a considerable time for a mode switching due to the time consumption attributed to the Guest OS booting.

In the activating step, the mobile terminal 100 can activate either the first mode or the second mode in accordance with a user selection or a prescribed reference when an operating system booting, under the control of the controller 180.

For instance, when the single OS, any one of the first and second modes can be activated in accordance with the single OS booting. In another instance, when the multi-OS, a mode selected by a user from the first mode and the second mode or a firstly booting completed one of the first mode and the second mode is activated in accordance with the simultaneous booting of the multi-OS or a mode corresponding to the preferentially booted OS in accordance with the sequential booting of the multi-OS can be activated.

In particular, when the sequential booting of the multi-OS, the mobile terminal 100 can preferentially boot the OS, which meets a prescribed condition, under the control of the controller 180. For instance, the controller 180 can preferentially boot the OS that meets one of the conditions such as an OS having a preferential booting order, an OS designated by a user to be preferentially booted and an OS supporting a mode corresponding to a current terminal status. For instance, if a current terminal location corresponds to a specific place corresponding to a specific mode or a current hour belongs to a specific time corresponding to a specific mode, a specific mode can be preferentially activated when booting an operating system.

In the following description, a method of managing information in a mobile terminal according to one embodiment of the present invention is explained in detail with reference to FIG. 12. Referring to FIG. 12, the mobile terminal 100 designates at least one of at least one function, at least one application, at least one content and at least one data to a first or second mode under the control of the controller 180 (S1210).

For clarity and convenience of the following description, if a thing includes at least one of a function, application, content and data, it can be named an execution target information.

In this instance, a specific function designation to a specific mode can include a designation to enable a specific function to operate in a specific mode only on a designation performed in a manner of designating information required for a specific function execution or a content or data generated in accordance with a specific function execution to a specific mode. In addition, a designation of a specific application for a specific mode can include a designation to enable a specific application to run in a specific mode only or a designation performed in a manner of designating information required for a setting and execution of a specific application, an identification information (e.g., an icon, name, symbol, image or the like to indicate a specific application) or a content or data generated in accordance with an execution of a specific application to a specific mode. In addition, a designation of a content or data to a specific mode can include a designation performed in a manner of designating a content or data itself, an address information on a web server for providing a content or data or an application having a content or data related thereto to a specific mode. In addition, a specific content or data can be automatically designated to a specific mode if a specific application is designated to the specific mode.

Moreover, after a specific application has been fixedly designated to a specific mode, a user is unable to arbitrarily delete or edit the specific application. For instance, a specific mode can include a business mode and a specific application can include an application (e.g., an application providing a basic function, etc.) fixedly designated to a business mode.

In the designating step S1210, the mobile terminal 100 can designate at least one execution target information (hereinafter named a first dedicated execution target information or a second dedicated execution target information) executable in each of the first and second modes only. In addition, the mobile terminal 100 can designate at least one execution target information (hereinafter named a common execution target information) executable in both of the first and second modes.

In particular, when the common execution target information is designated, the mobile terminal 100 can designate the common execution target information to each of the first mode and the second mode by changing a feature of the common execution target information under the control of the controller 180.

For instance, when a common execution target information is a specific application, it can designate the specific application to each of the first and second modes in a manner of differentiating at least one of a running feature, a menu configuration, a provided function, a display feature when running, and a version of the specific application. When a common execution target information is a voice call function, a transceiving function is set to be provided for a private mode but a transmitting function is set to be provided for a business mode only. When a common execution target information is a counterpart information or a schedule, a counterpart information or schedule having a first data field structure is provided in a private mode but a counterpart information or schedule having a second data field structure can be provided in a business mode.

The mobile terminal 100 can display a menu for designating at least one execution target information to each of the first and second modes using the display unit 151. In addition, it can designate at least one execution target information to each of the first and second modes using the displayed menu.

This is explained in detail with reference to FIGS. 13A to 13D as follows. FIGS. 13A to 13D are diagrams of screen configurations for designating information per mode using a menu according to an embodiment of the present invention.

Referring to FIG. 13A, the mobile terminal 100 displays a menu corresponding to a mode configuration setting and is then able to perform at least one of a per-mode application designation, a per-mode content designation and a per-mode data designation using the displayed menu.

Referring to FIG. 13B, if the per-mode application designation is selected in FIG. 13A, the mobile terminal 100 displays an application list and is then able to designate an application, which is selected by a user from the displayed application list, to a private mode. Of course, the embodiment described with reference to FIG. 13B is applicable to a designation to a business mode as well.

In particular, referring to FIG. 13B(a), the mobile terminal 100 can display identity information P, B or PB on a mode currently designated to each of a plurality of applications included in the application list. Alternatively, referring to FIG. 13B(b), the mobile terminal 100 can identifiably (e.g., thick, etc.) display applications designatable to a private mode in the application list. For instance, the applications designatable to the private mode can include an application designatable to both the private mode and a business mode in common despite being currently designated to the business mode only, an application failing to be designated to any mode and the like.

Referring to FIG. 13C or 13D, if the per-mode content designation or the per-mode data designation is selected in FIG. 13A, the mobile terminal 100 displays a content list and then designates a content, which is selected by a user from the content list, to a business mode (FIG. 13C). Alternatively, the mobile terminal 100 displays a data list and is then able to designate a data, which is selected by a user from the data list, to the business mode (FIG. 13D). Of course, the embodiment shown in FIG. 13C or 13D is applicable to the designation to the private mode as well.

In particular, referring to FIG. 13C(a) or 13D(a), the mobile terminal 100 can display identification information P, B or PB on a currently designate mode for each of a plurality of contents included in the content list or for each of a plurality of data included in the data list. Referring to FIG. 13C(b) or 13D(b), the mobile terminal 100 can identifiably display the content or data designatable to the business mode in the content or data list.

Referring now to FIG. 12, in the designating step S1210, the mobile terminal 100 can designate an execution target information to at least one of the first mode and the second mode to correspond to a property of the execution target information under the control of the controller 180.

In this instance, a designation command for the execution target information per mode may not be input by a user. Moreover, when a property of the execution target information indicates a common designation to both of the first and second modes, the execution target information can be designated to both of the first and second modes in common (i.e., common execution target information). When a property of the execution target information indicates a dedicated designation to the first or second mode, the corresponding execution target information can be dedicatedly designated to the first or second mode (i.e., dedicated execution target information).

When a mode identification information indicating a corresponding mode is included in the execution target information, the controller 180 can designate the execution target information to a mode indicated by the included mode identification information. For instance, when a mode identification information indicating a private mode is included in an execution target information, the execution target information can be dedicatedly designated to the private mode.

When a module used for running a specific function or application is restricted from being activated in the first mode, the controller 180 can designate the specific function or application to the second mode. For instance, since a camera used for running a camera related function or a camera related application is restricted from being activated in the business mode, the camera related function or the camera related application can be dedicatedly designated to the private mode.

If an application related to a specific content or data is already designated to a specific mode, a specific content or data is generated on a place or time zone corresponding to a specific mode, a substance inferring a specific mode is contained in a specific content or data, or information corresponding to a specific mode is included in a specific content or data, the controller 180 can automatically designate the specific content or data to the specific mode.

For instance, a specific content or data can be dedicatedly designated to a business mode when being generated at a place (e.g., company, etc.) corresponding to the business mode or on a time zone (e.g., duty hours, etc.) corresponding to the business mode. In another instance, a specific content or data can be dedicatedly designated to a private mode when being generated at a place (e.g., a place except a company, home, etc.) corresponding to the private mode or on a time zone (e.g., a time except duty hours, a specific time zone, etc.) corresponding to the private mode. When a specific content is a birthday party video or a specific data is a personal schedule (e.g., mother's birthday, etc.), the specific content or data can b dedicatedly designated to a private mode. When a specific content is a document having a conference substance recorded therein or a specific data is a schedule having department members as participants, the specific content or data can be dedicatedly designated to a business mode.

In the designating step S1210, the mobile terminal 100 receives a command (hereinafter named a designation command) for designating at least one execution target information for at least one of the first mode and the second mode from a user via the user input unit 130 and is then able to designate the at least one execution target information for the at least one of the first mode and the second mode to correspond to the input designation command under the control of the controller 180. In particular, the controller 180 designates a common execution target information common to the first mode and the second mode or can designate a first execution target information and a second execution target information to the first mode and the second mode, respectively.

In the designating step S1210, in at least one of when downloading the execution target information, when displaying a list of the execution target information, when executing the execution target information, and when generating or editing a content or data in accordance with an application running, the controller 180 can designate the at least one execution target information for at least one of the first mode and the second mode. The download of the execution target information shall be described in detail later.

For example, at a timing point of the execution target information download, the mobile terminal 100 receives an input of a selection of a mode to which the execution target information will be designated from a user (1) or can automatically select a mode, to which the execution target information will be designated, by determining a mode identification information of the execution target information.

Alternatively, while a list of execution target information is displayed, the mobile terminal 100 can receive a selection of a mode, to which a specific execution target information will be designated, for the specific execution target information included in the displayed list from a user.

When executing a specific execution target information, if the specific execution target information is not designated to any mode (e.g., the mobile terminal 100 accesses a website and then plays a content provided by the accessed website), the mobile terminal 100 can designate the specific execution target information to a prescribed mode in accordance with a user designation command or a corresponding property (1). Alternatively, if the specific execution target information is designated to the first mode, the mobile terminal 100 can designate the specific execution target information to the second mode in accordance with a user designation command.

When generating (or editing) a specific content or data in accordance with a running of a specific application, the mobile terminal 100 designates the generated (or edited) specific content or data to a mode having the specific application designated thereto (1) or can designate the generated (or edited) specific content or data to a prescribed mode in accordance with a user designation command.

The designating step S1210 is explained in detail with reference to the accompanying drawings as follows. FIGS. 14A to 15B are diagrams of screen configurations for designating an application per mode according to an embodiment of the present invention. In particular, a per-mode application designation explained in the following description can be performed in a configuration setting process of the mobile terminal 100.

Referring to FIG. 14A, when downloading a specific application (e.g., a common application) executable in both a business mode and a private mode, the mobile terminal 100 can designate the specific application to at least one of the private mode and the business mode. In the following description, a web server (or a website) for providing applications shall be named an application market.

In particular, referring to FIG. 14A(a), when attempting to download a first application by accessing an application market, if a zone (P mode download) corresponding to a download in a private mode is selected, the mobile terminal 100 downloads the first application and then designates the downloaded first application to the private mode (1). Alternatively, if a zone (B mode download) corresponding to a download in a business mode is selected, the mobile terminal 100 downloads the first application and then designates the downloaded first application to the business mode (2). Alternatively, if a zone (common mode download) corresponding to a download in the private mode and the business mode selected, the mobile terminal 100 downloads the first application and then designates the downloaded first application to both of the private mode and the business mode in common (3).

Referring to FIG. 14A(b), when attempting to download a first application by accessing an application market, the mobile terminal 100 receives an input of a download command action from a user and is then able to display a window for enabling the user to select a mode to which the first application will be designated. Therefore, the first application can be downloaded in a manner of being designated to the mode selected by the user.

Referring to FIG. 14B, when downloading a specific application (e.g., a dedicated application) executable in either a business mode or a private mode, the mobile terminal 100 can designate the specific application to a mode in which the specific application is executable.

In particular, when receiving an input of a download command for a second application executable in a private mode only (FIG. 14B(a)), the mobile terminal 100 downloads the second application and is then able to automatically designate the downloaded second application to the private mode (FIG. 14B(b)). Furthermore, if a user selects a zone (B mode similar application) corresponding to information on an application (hereinafter named a similar application of a business mode) executable in the business mode as an application for providing a function similar to that of the second application in FIG. 14B(b), the mobile terminal 100 can provide a market address for providing a similar application of the business mode, address/location information of the similar application of the business mode within a corresponding market and the like.

Meanwhile, when downloading an application from an application market, which provides an application executable in a business mode (or a private mode) only, the mobile terminal 100 can automatically designate the downloaded application to the business mode (or the private mode).

Referring to FIG. 15A, the mobile terminal 100 displays a list including a plurality of applications and is then able to receive an input of a command for designating at least one of a business mode and a private mode for a plurality of the applications included in the displayed list.

In particular, referring to FIG. 15A(a), the mobile terminal 100 displays a check box P of a private mode and a check box B of a business mode for each of a plurality of the applications. If a user selects the check box P (or the check box B), the mobile terminal 100 designates the corresponding application to the private mode (or the business mode) (i.e., designation of a dedicated application) (1). Alternatively, if a user selects both of the check box P and the check box B, the mobile terminal 100 can designate the corresponding application to the private mode and the business mode in common (i.e., designation of a common application) (2).

Referring to FIG. 15A(b), when receiving a touch & drag action from a first application to a private zone P, the mobile terminal 100 can dedicatedly designate the first application to a private mode (1). When receiving a touch & drag action from a second application to a business zone B, the mobile terminal 100 can dedicatedly designate the second application to a business mode (2). When receiving a touch & drag action from a third application to a common zone COMMON, the mobile terminal 100 can dedicatedly designate the third application to the business mode and the private mode in common (3).

Referring to FIG. 15B, if a prescribed key is selected in the course of running a first application in an activated state of a private mode (FIG. 15B(a)), the mobile terminal 100 can designate the first application to a business mode (FIG. 15B(b)). For instance, the first application can include a common application. In addition, the prescribed key can be provided in faun of a toggle key.

Figure 16A:
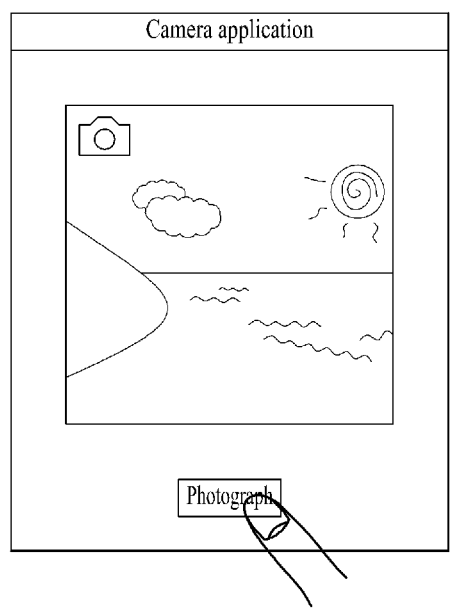
Figure 17A:

FIGS. 16A and 16B are diagrams of screen configurations for designating a content per mode according to an embodiment of the present invention. In addition, FIGS. 17A and 17B are diagrams of screen configurations for designating a data per mode according to an embodiment of the present invention.

For clarity and convenience of the following description, assume that a content is a video. In addition, assume that a data is a counterpart information. Of course, the content or data is non-limited by the above example and can apply to various forms. Moreover, a per-mode content or data designation in the following description can be performed in a configuration setting process of the mobile terminal 100.

Referring to FIG. 16A, when photographing a first video by running a camera related application (a), the mobile terminal 100 enables a user to select a mode to designate the video thereto (b). Therefore, the mobile terminal 100 can designate the first video to the mode selected by the user.

Referring to FIG. 16B, when the camera related application associated with the first video photographed in FIG. 16A(a) is designated to a private mode, the mobile terminal 100 can automatically designate the first video to the private mode. Moreover, if a camera is prohibited from operating in a business mode or a photographed time of the first video belongs to off-duty hours, the mobile terminal 100 can do so.

Referring to FIGS. 17A and 17B, when attempting to register a specific counterpart information by running a phonebook application, the mobile terminal 100 can designate the specific counterpart information to at least one of a private mode and a business mode.

In particular, referring to FIG. 17B(a), the mobile terminal 100 enables a user to select a mode to which the specific counterpart information will be designated. In addition, the mobile terminal 100 can automatically designate the specific counterpart information to the mode selected by the user.

Referring to FIG. 17B(b), if a substance (e.g., rank, level, etc.) having a security level set over a predetermined reference is included in the specific counterpart information, the mobile terminal 100 can automatically designate the specific counterpart information to the business mode.

FIGS. 18A to 18D are diagrams of screen configurations for designating information corresponding to a currently deactivated mode to a currently activated mode according to an embodiment of the present invention. For clarity and convenience of the following description, assume that a currently activated mode is a business mode. In addition, assume that a currently deactivated mode is a private mode.

Figure 18A:
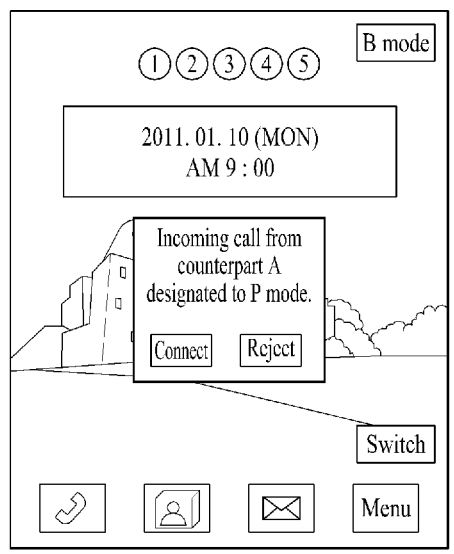
FIGS. 18A to 18D are diagrams of screen configurations for designating information corresponding to a currently deactivated mode to a currently activated mode according to an embodiment of the present invention.

Referring to FIG. 18A, while a business mode is activated, the mobile terminal 100 can detect a signal related to a private mode. The mobile terminal 100 can then output an indication information on the detected signal. For instance, the signal related to the private mode can be generated if a call is received from a counterpart A designated to the private mode. In another instance, the signal related to the private mode can be generated when receiving a message, an email, a conversation via messenger or the like from a counterpart designated to the private mode or indicating a schedule or alarm designated to the private mode.

Figure 18B:
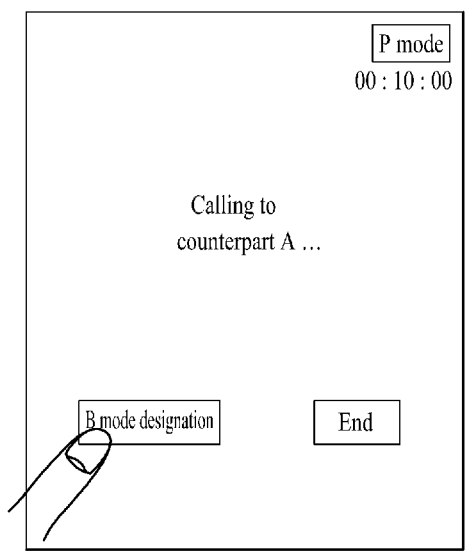

Referring to FIG. 18B, if a call connection is selected in FIG. 18A, the mobile terminal 100 can connect the call received from the counterpart A by switching a current mode to the private mode. If the call connection is terminated, the mobile terminal 100 can switch the private mode to the business mode in accordance with a user selection or automatically.

Figure 18C:
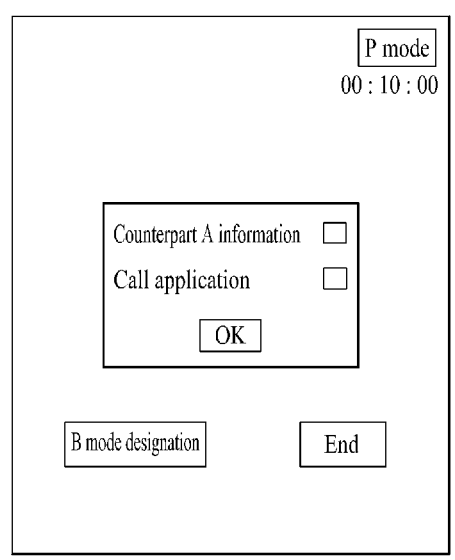

Referring to FIG. 18C, when receiving a user selection for a zone (B mode designation) for receiving a command for designating an execution target information related to the connected call to the business mode in FIG. 18B, the mobile terminal 100 can designate the execution target information related to the connected call to the business mode.

For instance, the execution target information related to the connected call can include on one a counterpart information corresponding to the counterpart A, a call application used for the call connection and the like. In addition, the command for the designation to the business mode can be input at any one of a call connection timing point, a random point in the course of the call connection, and a call end timing point.

Figure 18D:
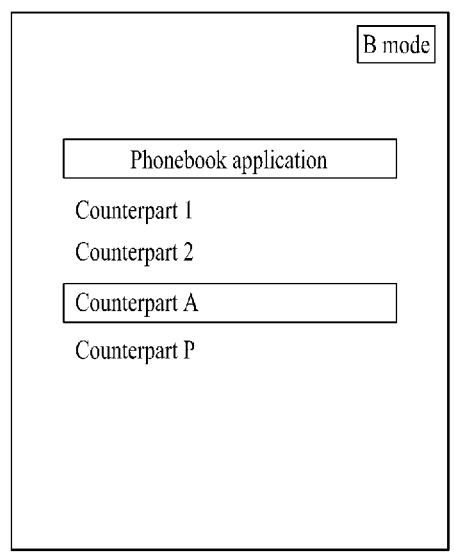

Referring to FIG. 18D, if the counterpart information corresponding to the counterpart A is designated to the business mode in FIG. 18C, when a phonebook application is running in the business mode, the mobile terminal 100 can display the counterpart information corresponding to the counterpart A in a manner that the counterpart information is included in a counterpart list.

Meanwhile, even if the call received from the counterpart A is not connected, the execution target information related to the corresponding call can be designated to the business mode.

FIGS. 19A to 19C are diagrams of screen configurations for designating a function per mode according to an embodiment of the present invention. In this instance, the per-more function designation can be performed in a configuration setting process of the mobile terminal 100. Referring to FIGS. 19A and 19B, the mobile terminal 100 can designate a voice call function, a message function, a messenger function and a camera function to a private mode using a function list (FIG. 19A). In addition, the mobile terminal 100 can designate a voice call function, an email function and a messenger function to a business mode using a function list (FIG. 19B).

Therefore, the mobile terminal 100 can change an executed function in accordance with whether a currently activated mode is the private mode or the business mode. For instance, in the business mode, it is unable to perform the video call function, the message function and the camera function. In the private mode, it is unable to perform the video call function and the email function.

Referring to FIG. 19C, when the function designation to the business mode, the mobile terminal 100 does not display a function, of which operation is prohibited in the business mode, on the function list at all or can display the corresponding function in a selection-impossible form (e.g., a blurring, touch input shutdown, etc.) on the function list.

Referring now to FIG. 12, the mobile terminal 100 receives an input of an editing command for editing a specific execution target information among at least one ore mode execution target information designated to the first mode or an input of a shift command for shifting to the second mode via the user input unit 130 (S1120).

For instance, the editing command or the mode shift command for shifting to the second mode can be input by one of a selection of a corresponding key zone, a corresponding touch action or touch & drag action, a corresponding terminal motion detection, a corresponding user voice input, a corresponding menu selection and the like. Moreover, the editing command or the shift command for shifting to the second mode can differ from each other in input form.

To help the editing command or the shift command for shifting to the second mode, the mobile terminal 100 can identifiably display an editing/shift restricted execution target information or an editable/shiftable execution target information under the control of the controller 180.

Figure 20C:
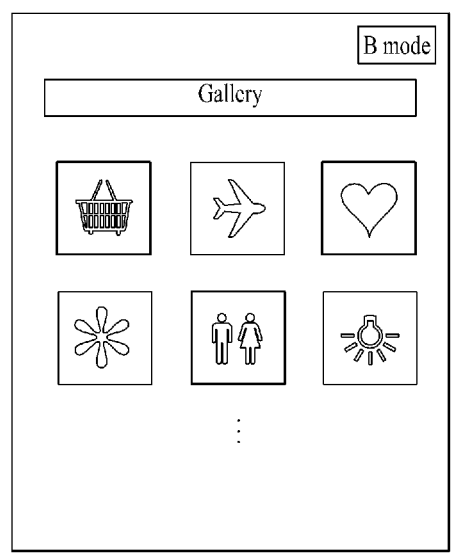

This is explained in detail with reference to FIGS. 20A to 20C as follows. FIGS. 20A to 20C are diagrams of screen configurations for identifiably displaying an editing/shift restricted information or an editable/shiftable information according to an embodiment of the present invention.

Referring to FIG. 20A, the mobile terminal 100 displays a shift restriction display (N) for an application, of which editing or shift to a different mode is restricted, on an application list. In addition, the mobile terminal 100 can display a shift-possible display (Y) for an application, of which editing or shift to a different mode is allowed, on the application list.

Referring to FIG. 20B, while a phonebook application is running, if a counterpart list id displayed, the mobile terminal 100 can display a presence or non-presence of possibility of an editing or shift to a different mode (impossible_N, possible_Y) for a counterpart information included in the counterpart list (FIG. 20B(a)). When displaying a specific counterpart information, the mobile terminal 100 can display a presence or non-presence of possibility (impossible_N, possible_Y) of an editing or shift to a different mode for each of a plurality of data fields configuring the specific counterpart information (FIG. 20B(b)).

Referring to FIG. 20C, while a video play application is running, when displaying a video list, the mobile terminal 100 can identifiably display (e.g., thick box treatment, zoom-in display, etc.) of a video, of which editing or shift to a different mode is possible (or impossible), among videos included in the video list.

Referring now to FIG. 12, the mobile terminal 100 restricts an editing or shift to the second mode for the specific execution target information, of which shift or editing command has been input in the inputting step S1220 (S1230).

In this instance, the editing of the specific function can include one of a deletion of the specific function, a partial function restriction of the specific function, modification of identification information on the specific function and the like. In addition, the editing of the specific application can include one of a deletion of the specific application, a modification of identification information of the specific application, an editing of a content or data associated with the specific application (explained later), partial restriction on functions provided by the specific application, and the like. In addition, the editing of the specific content or data can include one of a deletion of the specific content or data, a corresponding substance modification of the specific content or data, a different substance addition, an identification information modification and the like.

The shift to a different mode for the specific execution target information can include cutting the specific execution target information out of a corresponding mode and then adding it to a different mode or copying the specific execution target information and then adding it to a different mode, In the former case, the specific execution target information can be designated to the different mode only. In the latter case, the specific execution target information can be designate to a mode before the shift and a mode after the shift both. Moreover, the shift to a different mode for the specific execution target information can include the specific execution target information being allowed to be accessed in the different mode.

In the following description, the execution target information, of which editing or shift to a different mode is restricted, among at least one or more execution target information designated to the first mode and the second mode is explained in detail.

First of all, according to a first case, the mobile terminal 100 receives an input of a command (hereinafter named a designation command) for designating an execution target information to restrict an editing or shift to a different mode from a user via the user input unit 130 and is then able to restrict the editing or shift to the different mode for the execution target information corresponding to the input designation command.

According to a second case, the controller 180 can restrict an editing or shift to the second mode (or the first mode) for the dedicated execution target information of the first mode (or the second mode).

Moreover, in at least one of a level of the first mode being higher than that of the second mode, a level over a predetermined reference being set on at least one of dedicated execution target information of the first mode, and a level for restricting the editing or the shift to the different mode being set on at least one of the dedicated execution target information of the first mode, the controller 180 can restrict the editing or shift to the second mode for the dedicated execution target information of the first mode.

For instance, one of a plurality of levels differing from each other in security level can be set on each of a dedicated execution target information, a first mode and a second mode. In addition, the corresponding level can be set on each of the dedicated execution target information, the first mode and the second mode by a user, the controller 180 or the company server 300 (when the dedicated execution target information corresponding to the business mode). In particular, the higher the level gets, the greater the security level becomes. Moreover, one of a level for allowing an editing or shift to a different mode and a level for restricting an editing or shift to a different mode can be set on the dedicated execution target information.

Meanwhile, although the second case is described for the case of the dedicated execution target information only, the same description is applicable to a common execution target information as well.

According to a third case, the controller 180 can restrict an editing or shift to a different mode for an execution target information designated to a business mode. This is because the execution target information designated to the business mode can include information that requires a security of a predetermined level or information that is not arbitrarily modifiable by an individual.

In the restricting step S1120, for the execution target information of which editing or shift to a different mode is restricted, the mobile terminal 100 does not allow the editing or shift to a different mode at all (Case 1), allows the editing or shift to a different mode after completion of an authentication procedure (Case 2), or can allow the editing or shift to a different mode for a portion of whole substance of the restricted execution target information (Case 3), under the control of the controller 180.

In particular, in Case 2, a whole or partial part of the execution target information can be edited or shifted to a different mode only if the authentication procedure is validly performed. In Case 3, a partial substance of the execution target information, of which security level is equal to or lower than a predetermined reference or on which a public-open level is set, can be edited or shifted to a different mode.

In the following description, the restricting step S1230 is explained in detail with reference to the accompanying drawings. An editing or shift to a different mode for a specific execution target information, which is described in the following, can be performed in a configuration setting process of the mobile terminal 100.

FIG. 21 is a diagram of screen configuration for an application shift according to an embodiment of the present invention. Referring to FIG. 21, while an application list is displayed, when receiving an input of a shift command for shifting to a different mode for a specific application of which shift to a different mode is restricted (FIG. 21(*a*)), the mobile terminal 100 can output information indicating that the specific application is not shiftable to the different mode (FIG. 21(*b*)).

In addition, the mobile terminal 100 can provide an address information on a web server of an application having a function similar to that of the specific application as an application executable in the different mode or an address information of a market that provides the application having the similar function.

Figure 22C:
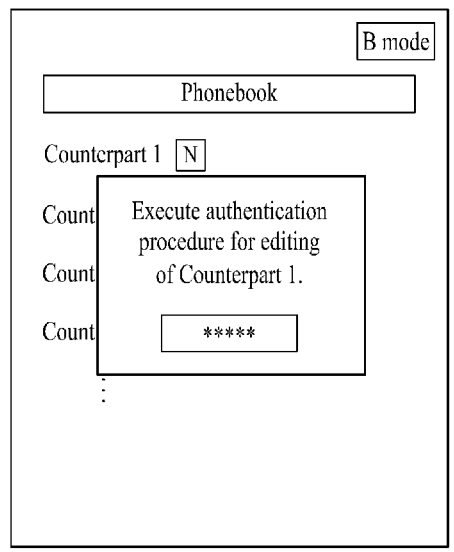

FIGS. 22A to 22D are diagrams of screen configurations for data editing/shift according to an embodiment of the present invention. Referring to FIG. 22A, while a business mode is activated, the mobile terminal 100 can display a counterpart list (FIG. 22A(a)). If a specific counterpart information is selected from the counterpart list, the mobile terminal 100 enables a user to select an editing of the specific counterpart information or a shift to a different mode for the specific counterpart information (FIG. 22A(b)). In this instance, the counterpart list can be generated in association with a phonebook application.

Referring to FIGS. 22B and 22C, when receiving a selection of a first counterpart information, of which editing or shift to a different mode is restricted, in FIG. 22A(a), the mobile terminal 100 performs an authentication procedure validly and then designates the first counterpart information by shifting it to a private information (e.g., 'shift to a different mode' is selected in FIG. 22A(b)). Alternatively, after the authentication procedure has been validly performed, the mobile terminal can edit the first counterpart information (e.g., 'edit; is selected in FIG. 22A(b).

Referring to FIG. 22D, when receiving a selection of a third counterpart information, of which editing or shift to a different mode is possible, in FIG. 22A(a), the mobile terminal 100 shifts a partially shiftable information of the third counterpart information to a private information and then designates it (i.e., if 'shift to a different mode' is selected in FIG. 22A(b)). Alternatively, the mobile terminal 100 can allow an editing of a partial information of the third counterpart information only (i.e., if 'edit' is selected in FIG. 22A(b)). Of course, an editing or shift to a private mode can be allowed for while substance of the third counterpart information.

Figure 23B:
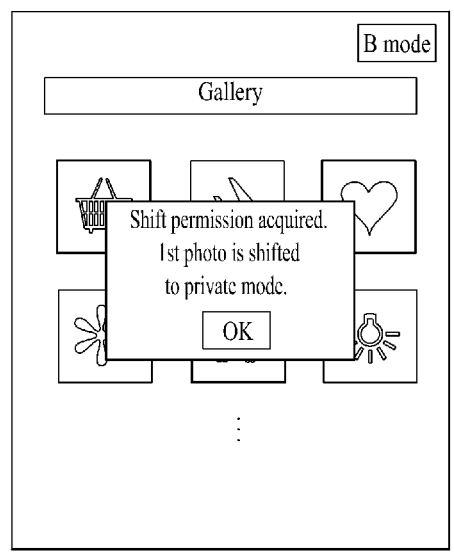

FIGS. 23A and 23B are diagrams of screen configurations for shifting a content according to an embodiment of the present invention. Referring to FIG. 23A, when receiving an input of a shift command for shifting to a different mode for a specific video, of which shift to the different mode is restricted, in a video list (FIG. 23A(a)), the mobile terminal 100 can acquire a shift permission from a different user terminal (e.g., a terminal of an approval authority) having a level equal to or higher than a predetermined level (FIG. 23A(b)).

Therefore, when acquiring the shift permission from the different user terminal having a level equal to or higher than the predetermined level, the mobile terminal 100 can shift the specific video to a different mode (FIG. 23B).

Meanwhile, when an editing command for a specific video is input, if an editing permission is acquired from the different user terminal having the level equal to or higher than the predetermined level, the mobile terminal 100 can shift the specific video to the different mode (FIG. 23B).

Figure 24A:
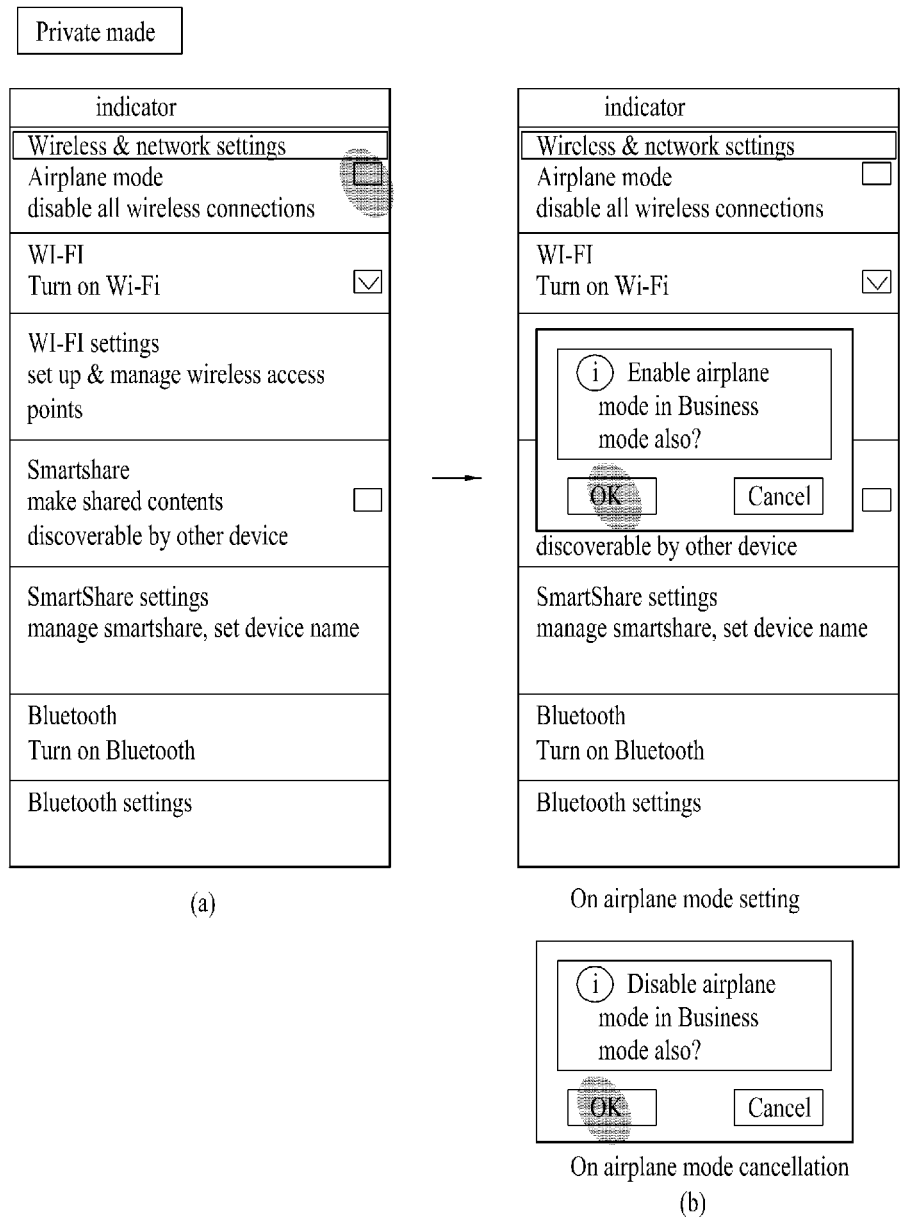

FIGS. 24A and 24B are diagrams of screen configurations for applying a configuration setting condition of one mode to another mode according to an embodiment of the present invention. Referring to FIG. 24A, while a private mode is activated, when setting a specific configuration for the private mode, the mobile terminal 100 can set the same specific configuration on a business mode in accordance with a user selection or automatically.

For instance, the specific configuration can include an activation or deactivation of an airplane mode. Moreover, the specific configuration can include an on/off state of a wireless internet communication, a presence or non-presence of an auto rotation function setting, an authentication information for canceling a screen lock state and the like. Referring to FIG. 24B, when setting an activation of the airplane mode on the business mode in FIG. 24A, the mobile terminal 100 can activate the airplane mode in an activated state of the business mode.

Figure 25A:
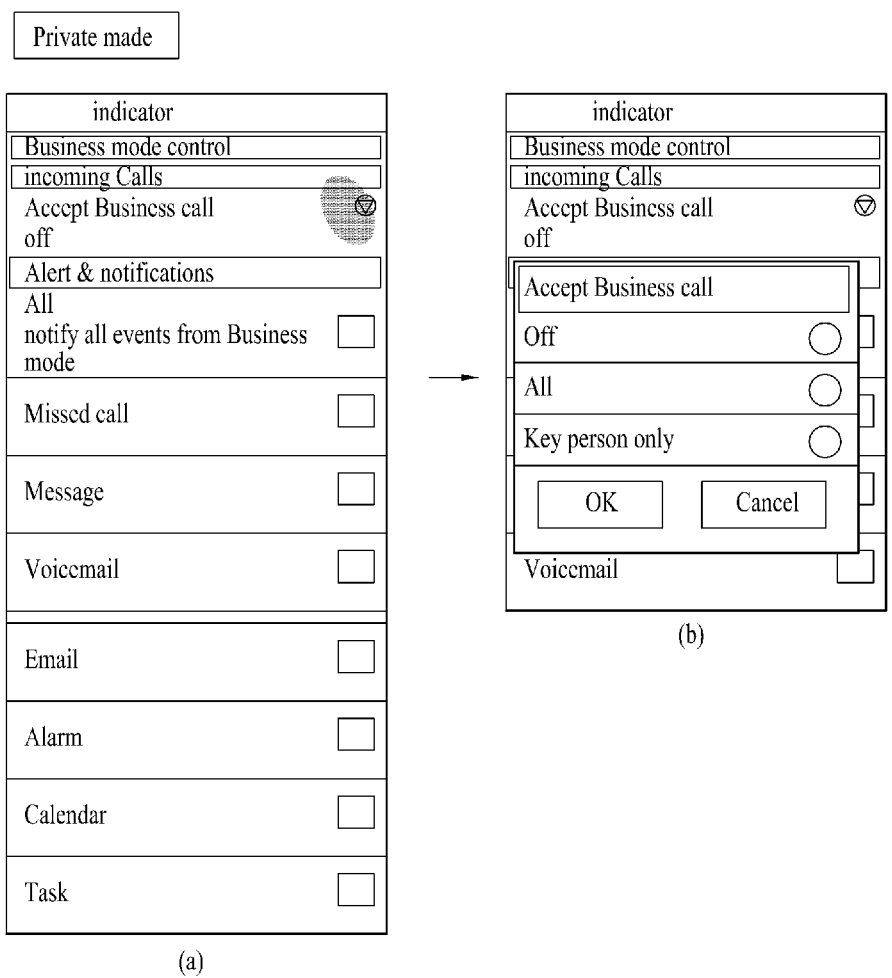

FIGS. 25A and 25B are diagrams of screen configurations for setting an event occurrence indicating condition of one mode in another mode according to an embodiment of the present invention. Referring to FIGS. 25A and 25B, while a private mode is activated, the mobile terminal 100 can set an event type for providing an indication of an occurrence of an event related to a business mode. While the business mode is activated, the mobile terminal 100 can set an event type for providing an indication of an occurrence of an event related to the private mode.

Meanwhile, as event occurrence indication conditions of a different mode, it can set an indication type (e.g., a text, an image, a bell sound, a lamp, etc.), an indication cycle, an indication count and the like as well as the event type.

According to an embodiment of the present invention, when downloading a specific execution target information as a common execution target information, the mobile terminal 100 can limitedly download the specific execution target information under the control of the controller 180.

In particular, when attempting to download a specific execution target information in a first mode, the controller 180 determines whether the specific execution target information was previously downloaded in a second mode. As a result of the determination, if the specific execution target information was previously downloaded, the controller 180 s able to download information (e.g., an identification information of an application corresponding to the first mode, information for executing the specific execution target information in the first mode, etc.) corresponding to the first mode only.

The controller 180 downloads the specific execution target information once only and then enables the downloaded information to be shared in both of the first and second modes.

When the specific execution target information includes a substance common to the first mode and the second mode, a substance dedicated to the first mode and a substance dedicated to the second mode, the controller 180 downloads the substance common to the first mode and the second mode and then shares the downloaded substance with the first mode and the second mode. The controller 180 downloads the substance dedicated to the first mode and enables the downloaded substance to be utilized in the first mode. In addition, the controller 180 downloads the substance dedicated to the second mode and enables the downloaded substance to be utilized in the second mode.

When downloading the specific execution target information in the first mode, the controller designates the specific execution target information to the first mode and can display an indicator for receiving an input of a designation or execution command for the specific execution target information in the second mode. Therefore, if the displayed indicator is selected by a user, the specific execution target information is designated to the second mode or can be executed in the second mode.

Meanwhile, the modes mentioned in this disclosure can variously include a religion mode, a hobby mode, a school mode and the like per type in addition to a private mode and a business mode. In addition, a plurality of modes can be set for each type.

In each of a plurality of the modes mentioned in this disclosure, a user interface related to at least one of a voice based communication and a text based communication can be provided via the display unit 151 under the control of the controller 180. For instance, the voice based communication includes a voice call, a voice based chatting and the like. In another instance, the text based communication can include a message service, a text based chatting and the like. The user interface is displayed as a virtual key form on a touchscreen or can be provided as a button key form. In addition, the user interface provided in each of a plurality of modes can differ in position, shape, size and the like.

According to one embodiment of the present invention, the above-described information managing method of the mobile terminal can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments for the mobile terminal and information managing method therein are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

Accordingly, the present invention provides the following effects and/or advantages.

First of all, when a plurality of modes are implemented, the present invention can designate a corresponding function, application or content/data to each of a plurality of the modes, thereby enabling a user to freely configure a menu per mode or information.

Secondly, since at least one of a function, an application and a content or data designated to one mode is restricted from being edited or shifted to a different mode, the present invention can manage information, of which content should not be arbitrarily modified, or information, which should be executed within a corresponding mode, separately.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a communication unit configured to communicate with at least one external terminal;
a memory configured to store at least a first operating system acting in a first mode and a second operating system acting in a second mode, respectively; and
a controller configured to:
execute the first operating system,
activate the first mode,
control a display unit of the mobile terminal to display a mode configuration screen including selectable options for designating a designated mode corresponding to at least one of the first and second modes to a particular information, and to selectively restrict assigning the particular information from the designated mode to a non-designated mode,
receive a command for selecting an application,
determine whether the selected application is executable in a currently activated mode among the first and second modes,
automatically identify an alternative application on the basis of similarity to the selected application, if the selected application is not executable in the currently activated mode, and
control the display unit to display information regarding the identified alternative application,
wherein the alternative application is executable in the currently activated mode and provides a function similar to that of the selected application.

2. The mobile terminal of claim 1, wherein the particular information includes at least one of a function, application, content and data.

3. The mobile terminal of claim 1, wherein the controller is further configured to selectively restrict assigning the particular information by restricting an editing or shifting operation of the particular information from the designated mode to the non-designated mode.

4. The mobile terminal of claim 3, wherein the controller is further configured to selectively restrict assigning the particular information from the designated mode the non-designated by at least one of 1) not allowing the editing or shifting operation of the particular information from the designated mode to the non-designated mode, 2) allowing the editing or shifting operation of the particular information from the designated mode to the non-designated mode after completion of an authentication procedure, and 3) allowing the editing or shifting operating of the particular information from the designated mode to the non-designated mode only for a portion of the particular information.

5. The mobile terminal of claim 3, wherein the controller is further configured to selectively restrict assigning the particular information from the designated mode the non-designated mode when 1) a level of the designated mode is higher than that of the non-designated mode, 2) the particular information has a set level that is over a predetermined reference, and 3) the particular information has a set shift/editing restriction level.

6. The mobile terminal of claim 1, wherein when the designated mode is a business mode and the non-designated mode is a private mode, the controller is further configured to restrict at least partially shifting the particular information from the business mode to the private mode.

7. The mobile terminal of claim 1, wherein the controller is further configured to control the display unit to distinguishably display the particular information that has been restricted from other information that has not been restricted.

8. The mobile terminal of claim 1, wherein the controller is further configured to receive a signal related to the second mode while the first mode is activated, and to designate information included in the received signal to the first mode.

9. The mobile terminal of claim 1, wherein the controller is further configured to display the mode configuration screen when at least one of 1) downloading the particular information, 2) displaying a list including the particular information, 3) executing the particular information, 4) generating content or data when executing the particular information, and 5) editing content or data generated when executing the particular information has been performed.

10. The mobile terminal of claim 3, wherein the editing operation includes at least one of 1) editing at least a portion of the particular information, 2) deleting at least a portion of the particular information, and 3) modifying identification content corresponding to the particular information, and
wherein the shifting operation includes at least one of 1) cutting and pasting of the particular information from the designated mode to the non-designated information, and 2) copying and pasting the particular information from the designated mode to the non-designated mode.

11. A method of controlling a mobile terminal, the method comprising:
allowing, via a communication unit of the mobile terminal, communication with at least one external terminal;
storing, in a memory of the mobile terminal, at least first and second operating systems including at least first and second modes, respectively;
executing, via a controller of the mobile terminal, the first operating system;
activating, via the controller, the first mode;
displaying, via a display unit of the mobile terminal, a mode configuration screen including selectable options for designating a designated mode corresponding to at least one of the first and second modes to a particular information;
selectively restricting, via the controller, assigning the particular information from the designated mode to a non-designated mode;
receiving, via a user input unit, a command for selecting an application;
determining, via the controller, whether the selected application is executable in a currently activated mode among the first and second modes;
automatically identifying, via the controller, an alternative application on the basis of similarity to the selected application, if the selected application is not executable in the currently activated mode, and
displaying, via the display unit, information regarding the identified alternative application,
wherein the alternative application is executable in the currently activated mode and provides a function similar to that of the selected application.

12. The method of claim 11, wherein the particular information includes at least one of a function, application, content and data.

13. The method of claim 11, wherein the selectively restricting step includes restricting an editing or shifting operation of the particular information from the designated mode to the non-designated mode.

14. The method of claim 13, wherein the selectively restricting step includes at least one of 1) not allowing the editing or shifting operation of the particular information from the designated mode to the non-designated mode, 2) allowing the editing or shifting operation of the particular information from the designated mode to the non-designated mode after completion of an authentication procedure, and 3) allowing the editing or shifting operating of the particular information from the designated mode to the non-designated mode only for a portion of the particular information.

15. The method of claim 13, wherein the selectively restricting step restricts assigning the particular information from the designated mode the non-designated mode when 1) a level of the designated mode is higher than that of the non-designated mode, 2) the particular information has a set level that is over a predetermined reference, and 3) the particular information has a set shift/editing restriction level.

16. The method of claim 11, wherein when the designated mode is a business mode and the non-designated mode is a private mode, the restricting step restricts at least partially shifting the particular information from the business mode to the private mode.

17. The method of claim 11, further comprising:
distinguishably displaying the particular information that has been restricted from other information that has not been restricted.

18. The method of claim 11, further comprising:
receiving a signal related to the second mode while the first mode is activated; and
designating information included in the received signal to the first mode.

19. The method of claim 11, wherein the mode configuration screen is displayed when at least one of 1) downloading the particular information, 2) displaying a list including the particular information, 3) executing the particular information, 4) generating content or data when executing the particular information, and 5) editing content or data generated when executing the particular information has been performed.

20. The method of claim 13, wherein the editing operation includes at least one of 1) editing at least a portion of the particular information, 2) deleting at least a portion of the particular information, and 3) modifying identification content corresponding to the particular information, and
   wherein the shifting operation includes at least one of 1) cutting and pasting of the particular information from the designated mode to the non-designated information, and 2) copying and pasting the particular information from the designated mode to the non-designated mode.

\* \* \* \* \*